United States Patent
Incesu et al.

(10) Patent No.: US 8,145,005 B2
(45) Date of Patent: Mar. 27, 2012

(54) METHOD FOR DISCRIMINATING TEXTURES REGIONS AND HOMOGENEOUS OR FLAT REGIONS IN AN IMAGE AND METHODS FOR ESTIMATING NOISE IN AN IMAGE SEQUENCE

(75) Inventors: Yalcin Incesu, Heidelberg (DE); Piergiorgio Sartor, Fellbach (DE); Altfried Dilly, Stuttgart (DE); Oliver Erdler, Ostfildern-Ruit (DE)

(73) Assignee: Sony Deutschland GmbH, Berlin (DE)

( * ) Notice: Subject to any disclaimer, the term of this patent is extended or adjusted under 35 U.S.C. 154(b) by 880 days.

(21) Appl. No.: 12/280,365

(22) PCT Filed: Feb. 22, 2007

(86) PCT No.: PCT/EP2007/001544
§ 371 (c)(1),
(2), (4) Date: Aug. 22, 2008

(87) PCT Pub. No.: WO2007/096168
PCT Pub. Date: Aug. 30, 2007

(65) Prior Publication Data
US 2009/0041373 A1    Feb. 12, 2009

(30) Foreign Application Priority Data

Feb. 22, 2006 (EP) .................................... 06003648
Feb. 22, 2006 (EP) .................................... 06003649
Mar. 31, 2006 (EP) .................................... 06006855

(51) Int. Cl.
*G06K 9/40* (2006.01)

(52) U.S. Cl. ...................................................... 382/254
(58) Field of Classification Search .................. None
See application file for complete search history.

(56) References Cited

U.S. PATENT DOCUMENTS

| 6,771,793 | B1 | 8/2004 | Yamada | |
|---|---|---|---|---|
| 2002/0031247 | A1* | 3/2002 | Matsuura et al. | 382/132 |
| 2004/0120597 | A1 | 6/2004 | Le Dinh | |
| 2005/0196037 | A1* | 9/2005 | Muenzenmayer et al. | 382/159 |

OTHER PUBLICATIONS

Andrew Glassner, "Adaptive Precision in Texture Mapping", Aug. 1986, ACM Comput. Surv., vol. 20, No. 4, pp. 297-306.*
Starck, J. et al., "Automatic Noise Estimation From the Multiresolution Support", Publications of the Astronomical Society of the Pacific, vol. 110, No. 744, pp. 193-199 (1998).
Meer, Peter et al., "A Fast Parallel Algorithm for Blind Estimation of Noise Variance", IEEE Transactions on Pattern Analysis and Machine Intelligence, vol. 12, No. 2, pp. 216-223 (1990).
Amer, Aishy et al., "Reliable and Fast Structure-Oriented Video Noise Estimation", IEEE: ICIP, vol. 2 of 3, pp. 840-843 (2002).
Shin, Dong-Hyuk et al., "Block-Based Noise Estimation Using Adaptive Gaussian Filtering", IEEE, pp. 263-264 (2005).

* cited by examiner

*Primary Examiner* — Jason M Repko
*Assistant Examiner* — Siamak Harandi
(74) *Attorney, Agent, or Firm* — Oblon, Spivak, McClelland, Maier & Neustadt, L.L.P.

(57) ABSTRACT

A method for discriminating textured regions and homogeneous or flat regions in an image. A multi-scale or multi-resolution measurement is performed with respect to the image. Alternatively or additionally, the image is analyzed by using a prior measured noise value and a local variance value in or with respect to the image.

18 Claims, 33 Drawing Sheets

General Processing Scheme

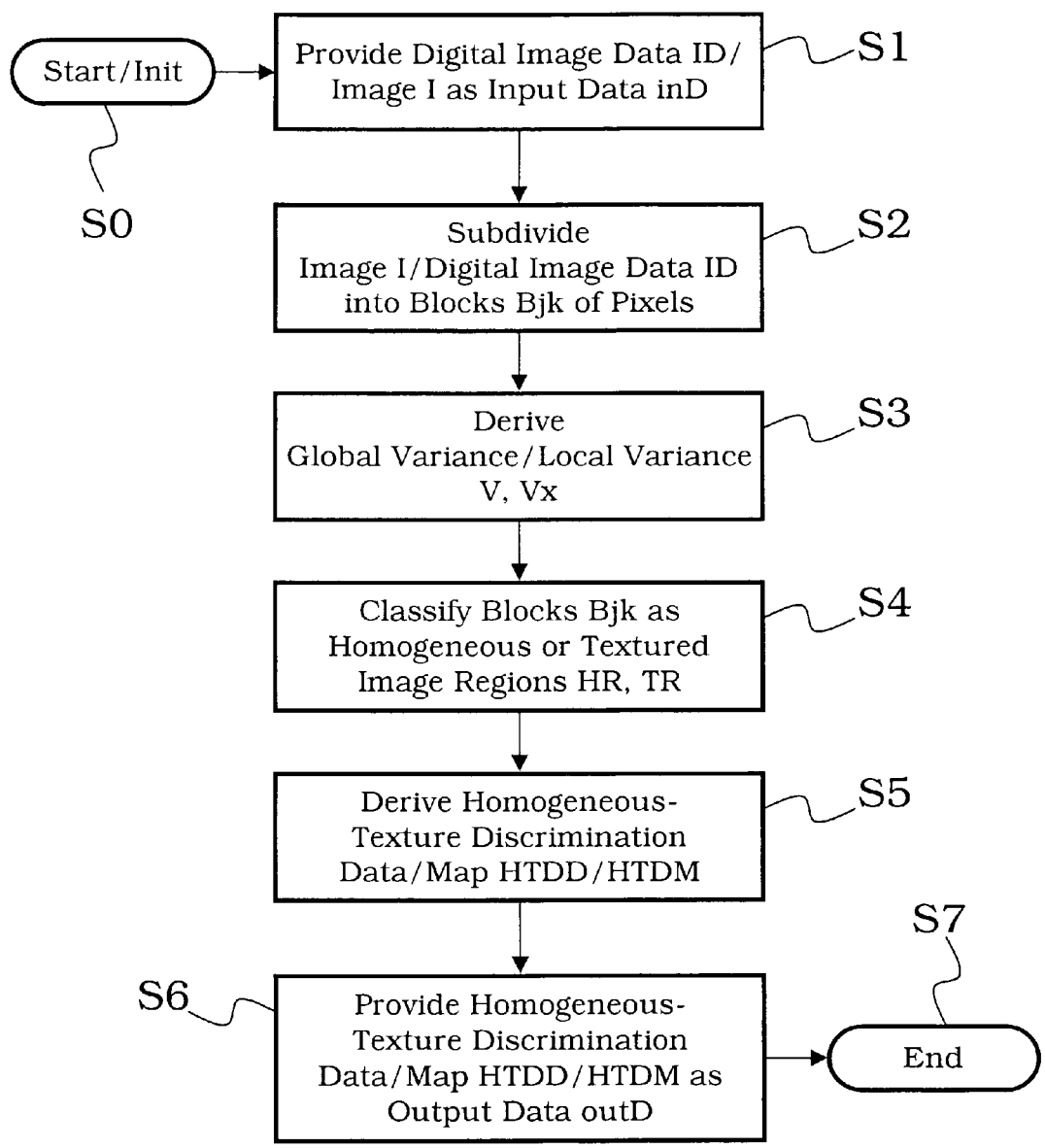
Fig. 1 - General Processing Scheme

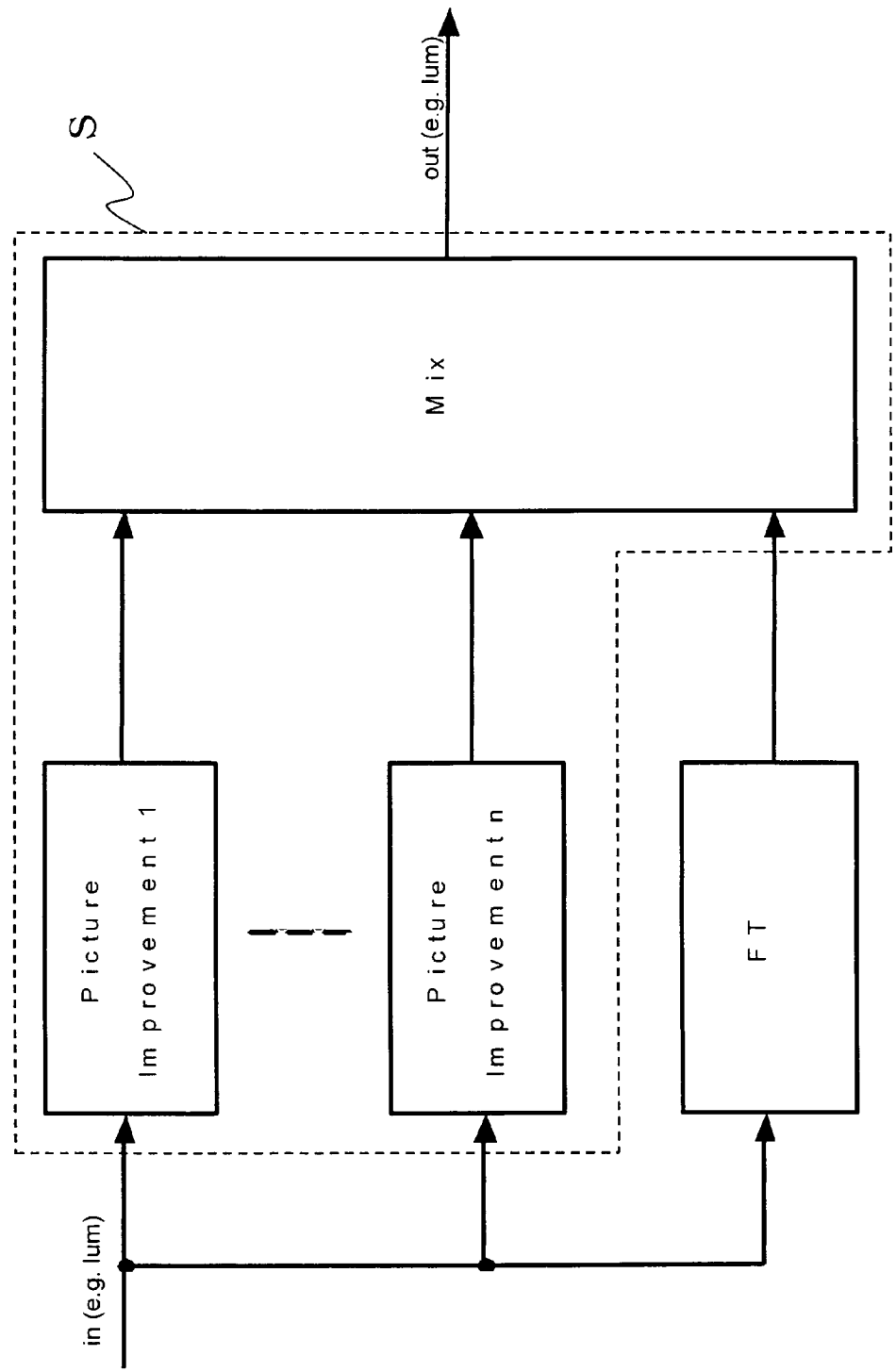
Fig. 2 - Overview

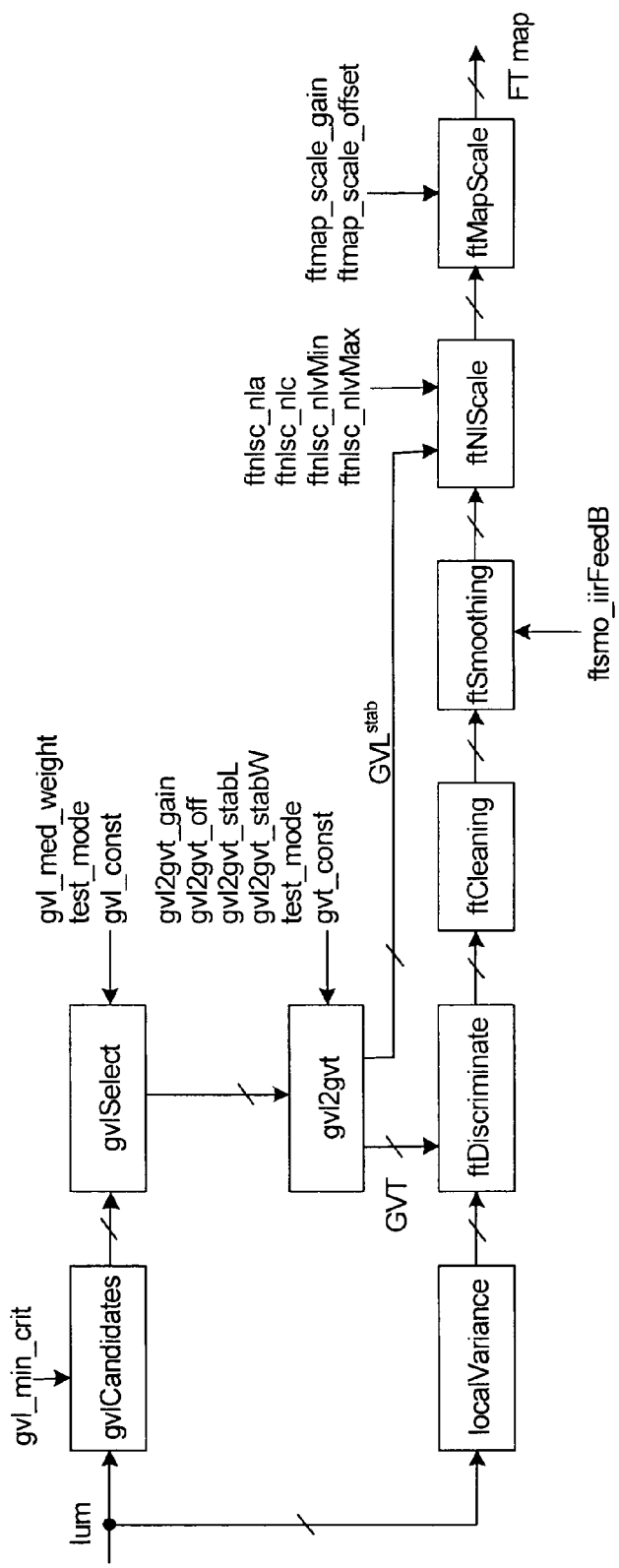
Fig. 3 - Processing Scheme

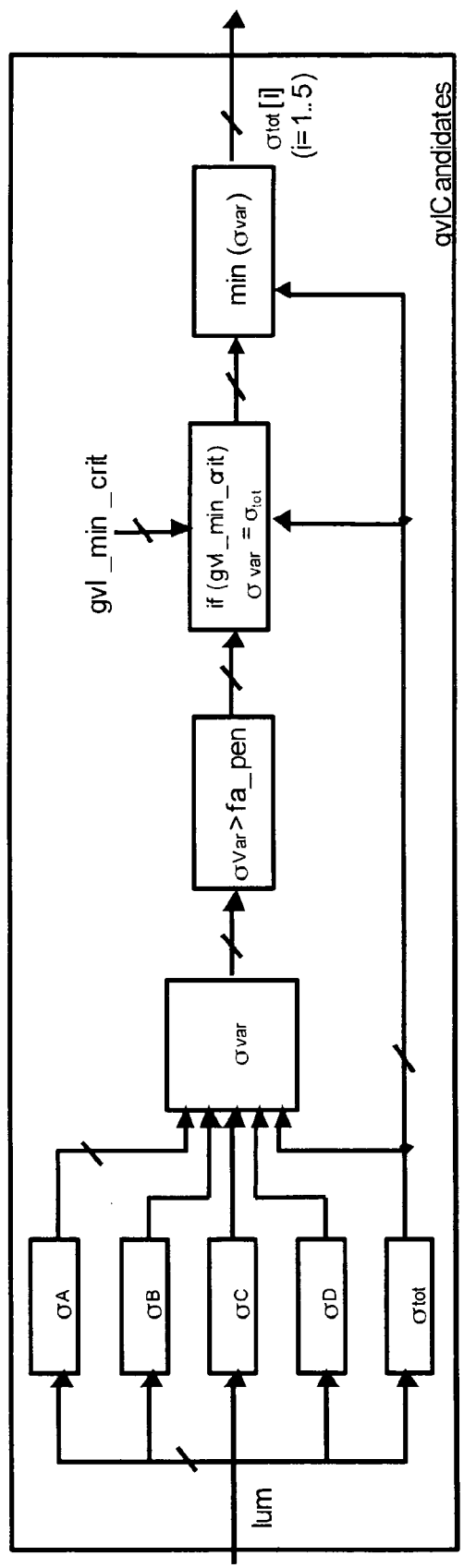
Fig. 4 - Global Variance Level Candidate Generation

Fig. 5 - Sub-Sampling Arrangement

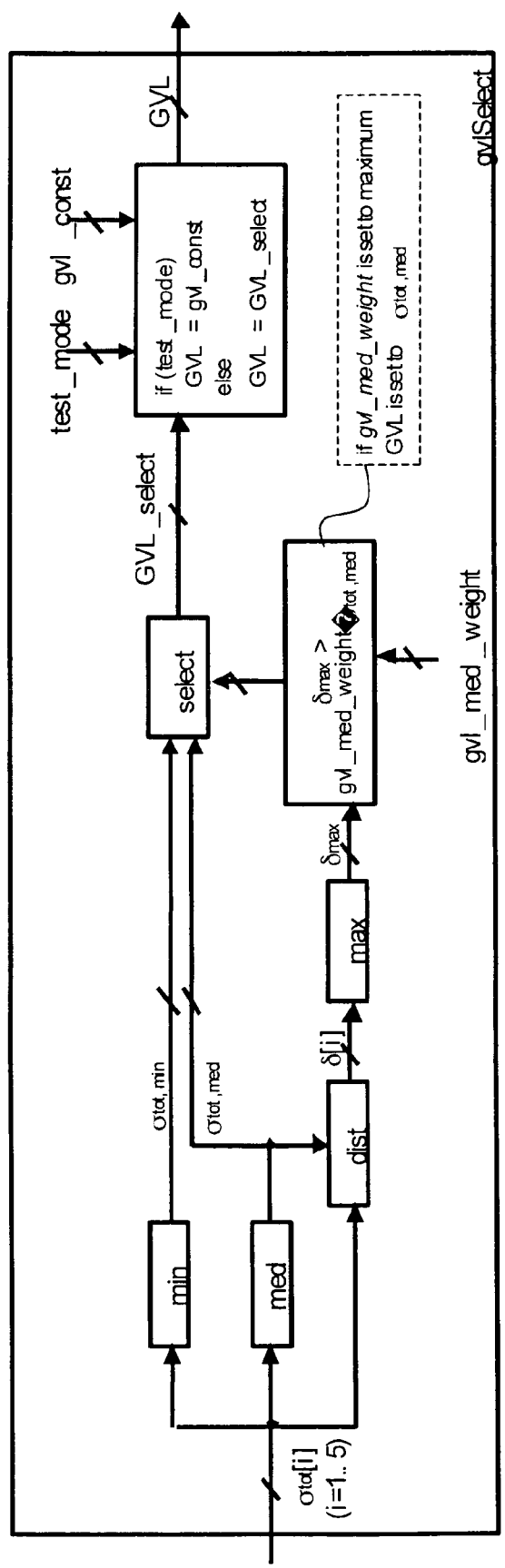
Fig. 6 - Global Variance Level Selection

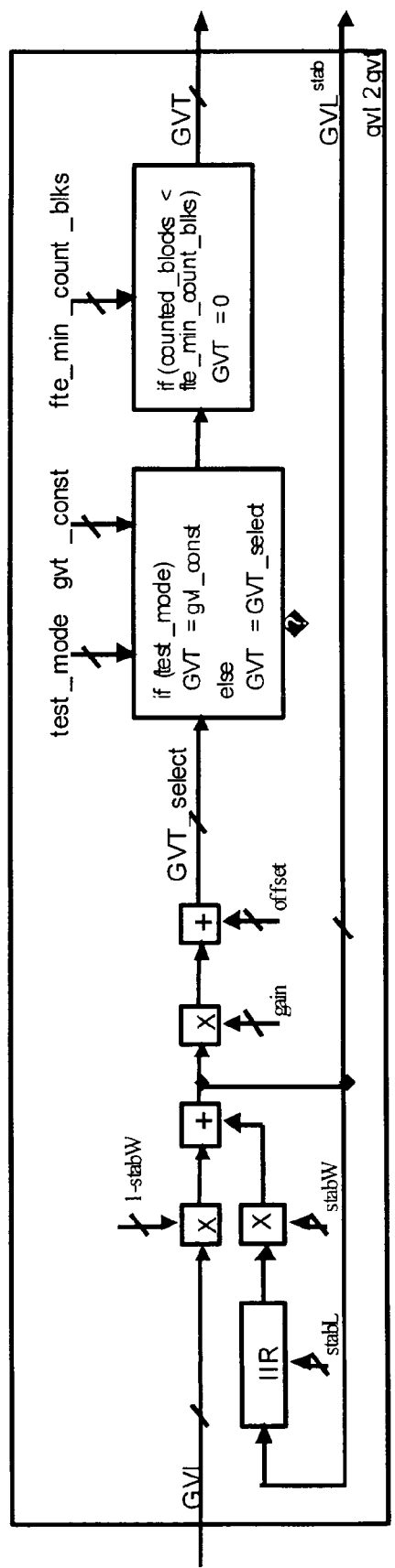
Fig. 7 - Global Variance Level to Global Variance Threshold Conversion

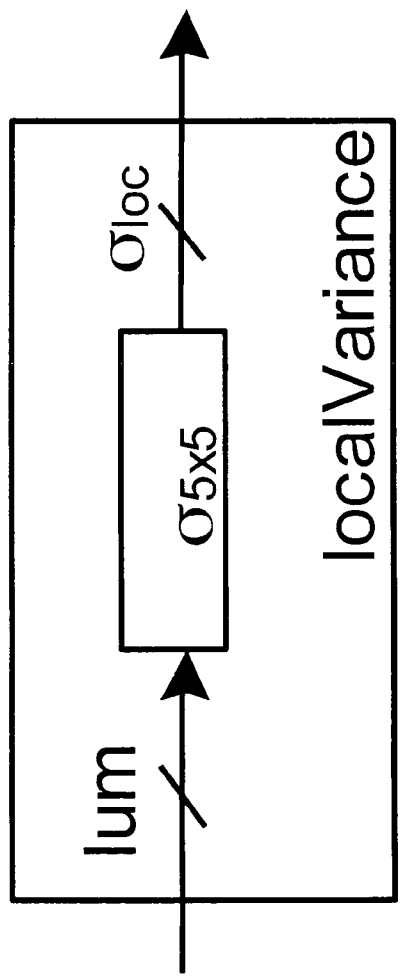
Fig. 8 - Local Variance Determination

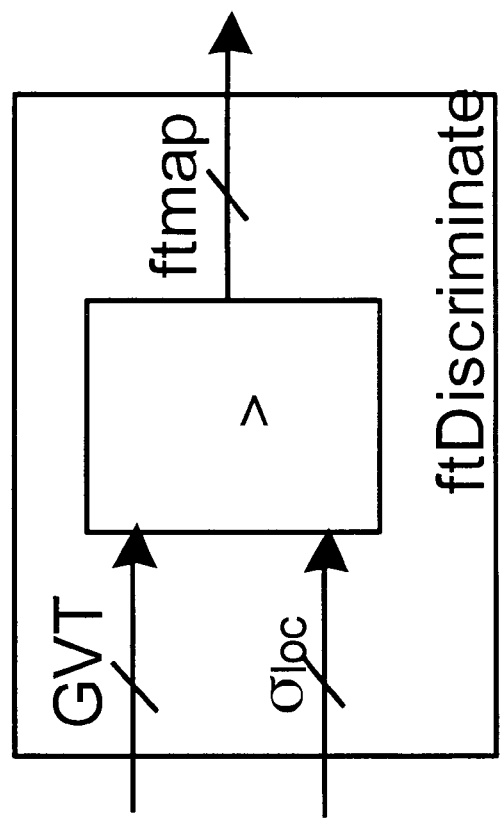
Fig. 9 - Homogeneous/Flat Texture Discrimination

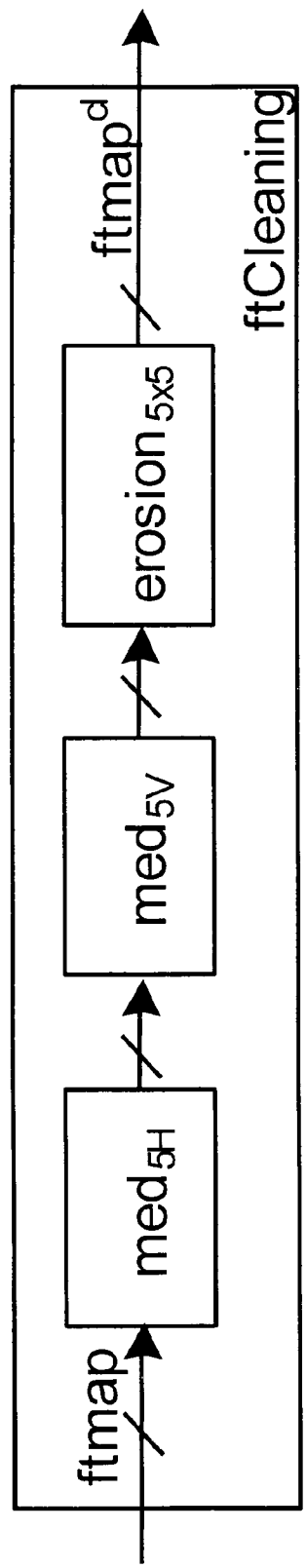
Fig. 10 - Homogeneous/Flat Texture Cleaning

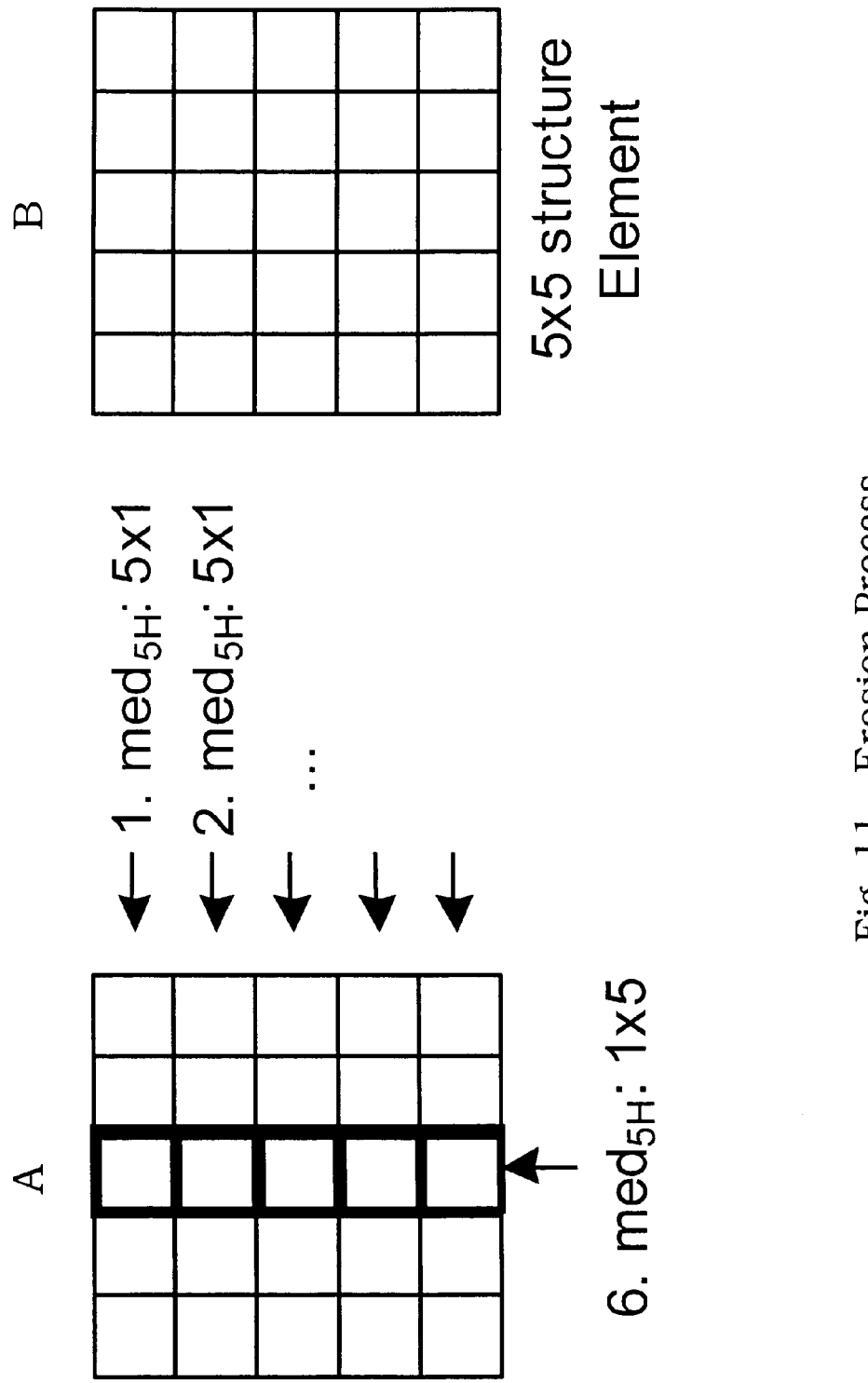
Fig. 11 - Erosion Process

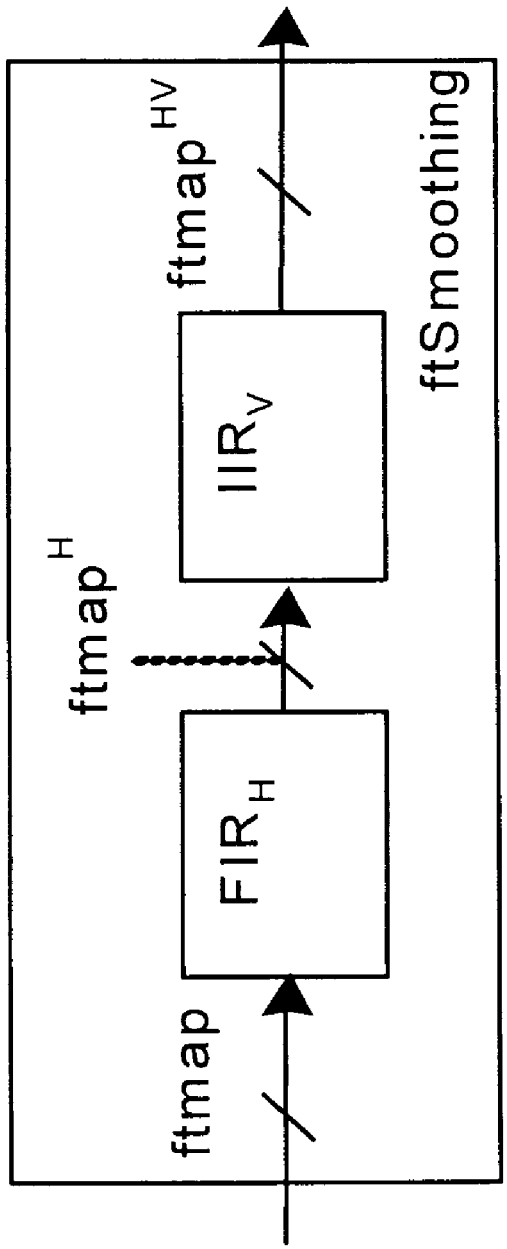
Fig. 12 - Homogeneous/Flat Texture Smoothing

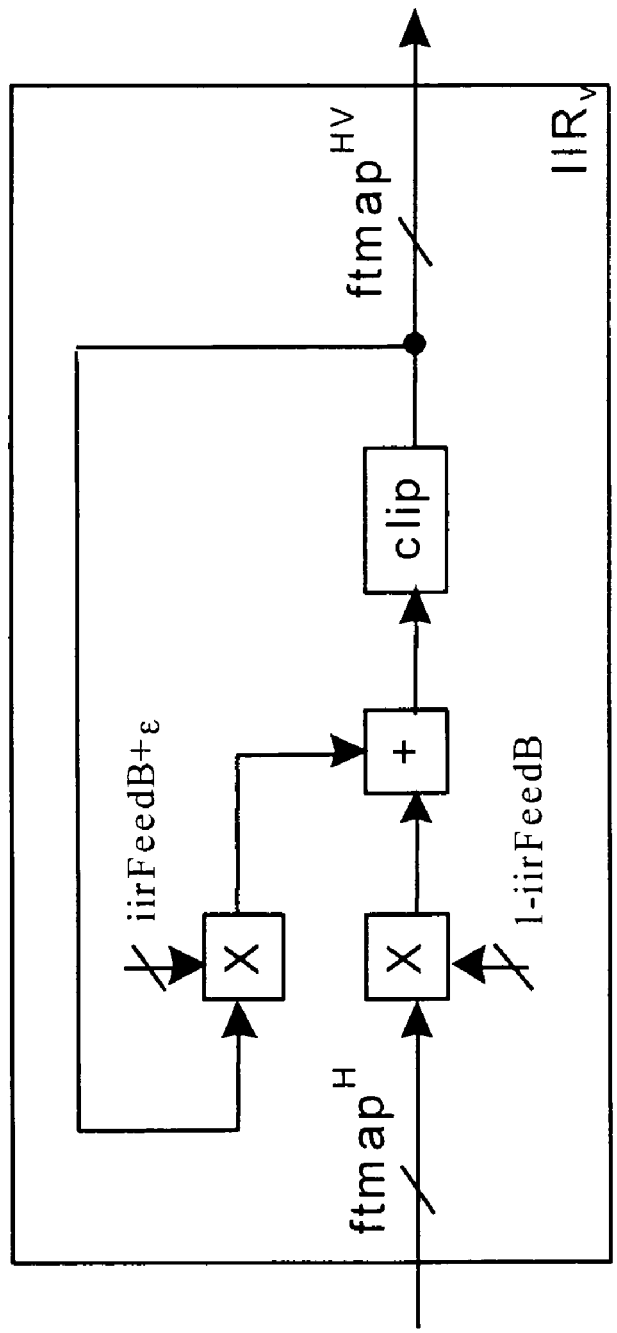
Fig. 13 - IIR Filter

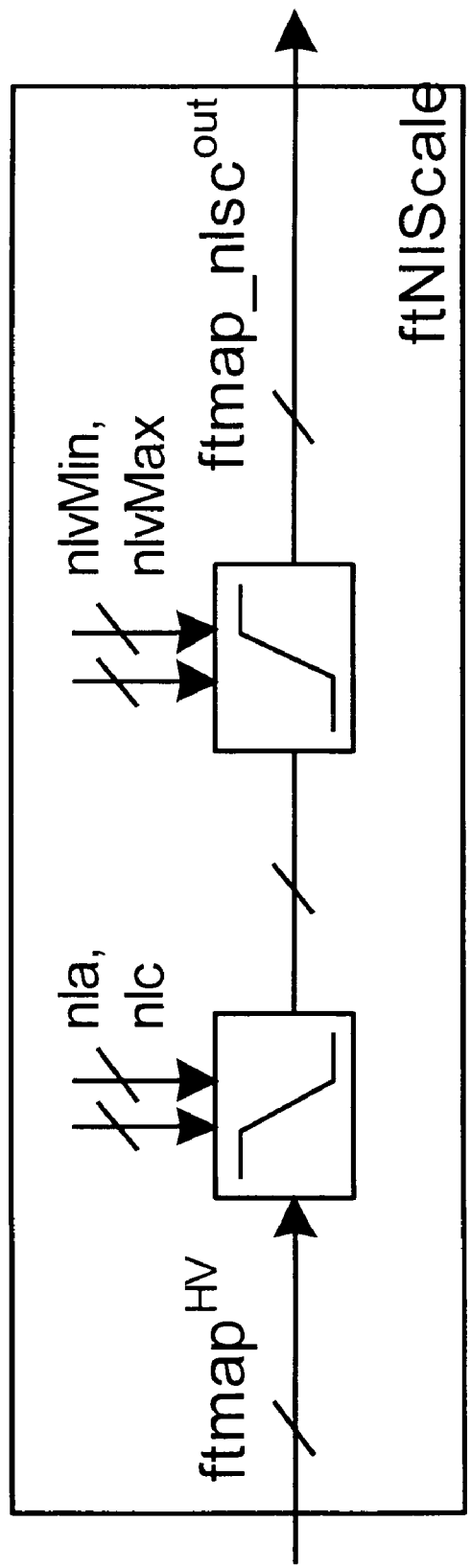
Fig. 14 - Homogeneous/Flat Texture Noise Level Scale

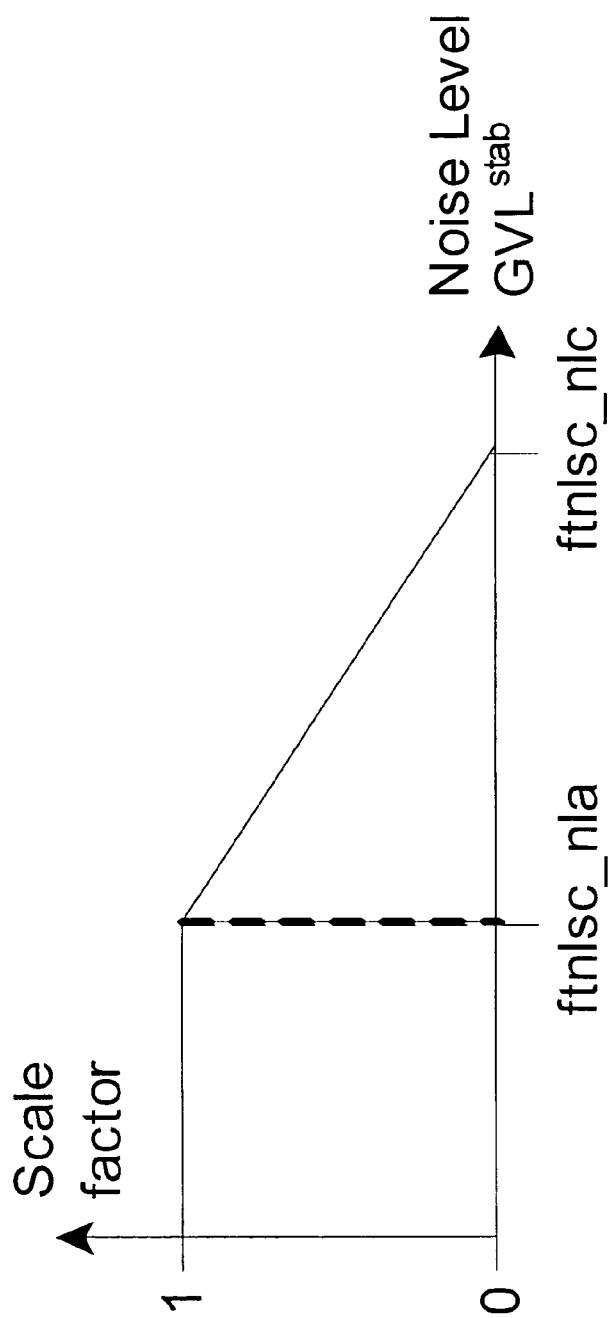
Fig. 15 - Scaling Transfer Function

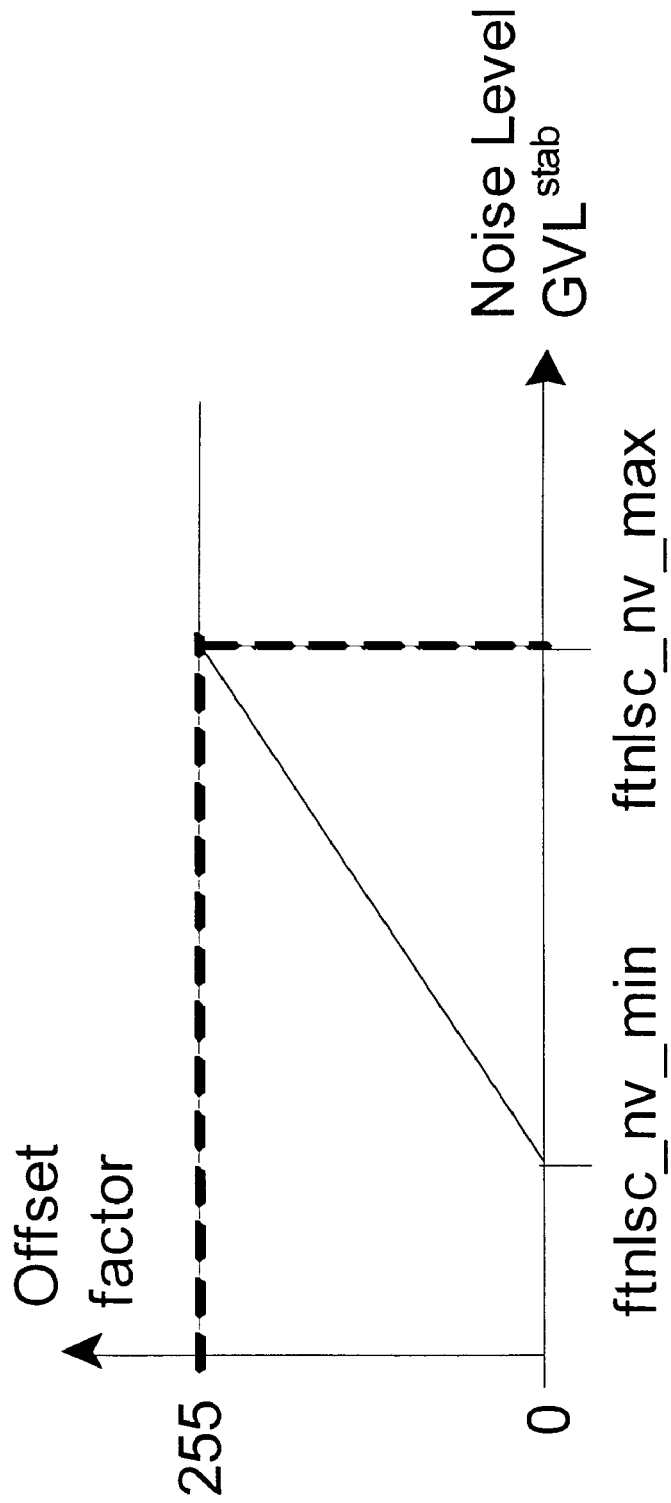
Fig. 16 - Offset Function

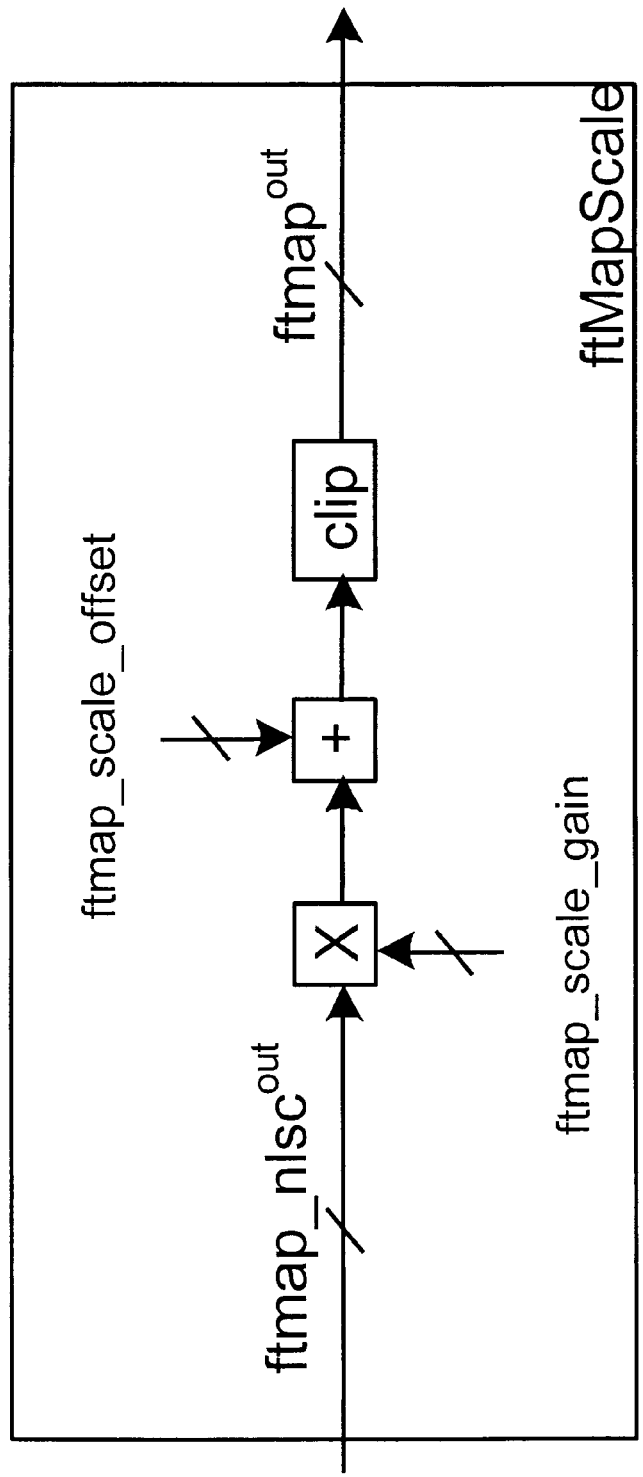
Fig. 17 - Homogeneous/Flat Texture Map Scaling

| Name | Function |
|---|---|
| gvl2gvt_gain | GVL scaling (gain) factor |
| gvl2gvt_off | GVL scaling (offset) factor |
| gvl2gvt_stabL | Stabilization length of GVL IIR filter |
| | 0: 1Tap 1: 2Taps 2,3: 4Taps |
| gvl2gvt_stabW | Stabilization weight used in GVL IIR filter |
| ftsmo_iirFeedB | Feedback coefficient of vertical IIR filter |
| ftnlsc_nla | GVL acceptance value for noise adaptive scaling |
| ftnlsc_nlc | GVL cut-off value for noise adaptive scaling |
| ftnlsc_nlvMin | Acceptance value of GVL validity |
| ftnlsc_nlvMax | Cut off value of GVL validity |
| ftmap_scale_gain | FT map scaling (gain) factor |
| ftmap_scale_offset | FT map scaling (offset) factor |
| gvl_med_weight | Adaptive median weighting value |
| gvl_min_crit | Flag enabling global minimum variance criterium |
| test_mode | Test mode on/off |
| | 0: Off (normal mode) 1: On (test mode) |
| gvl_const | Test mode GVL constant value |
| gvt_const | Test mode GVT constant value |
| dmy1_fte | dummy |
| fte_min_count_blks | Minimum count of blocks to activate GVT |

Fig. 18 - List of Registers

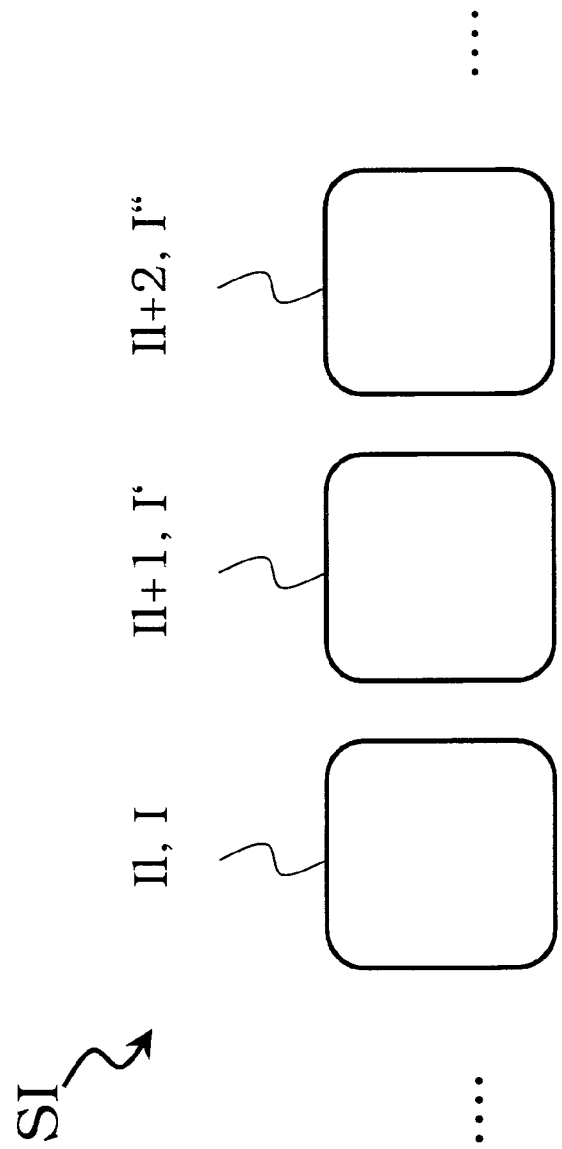
Fig. 19 - Image Sequence

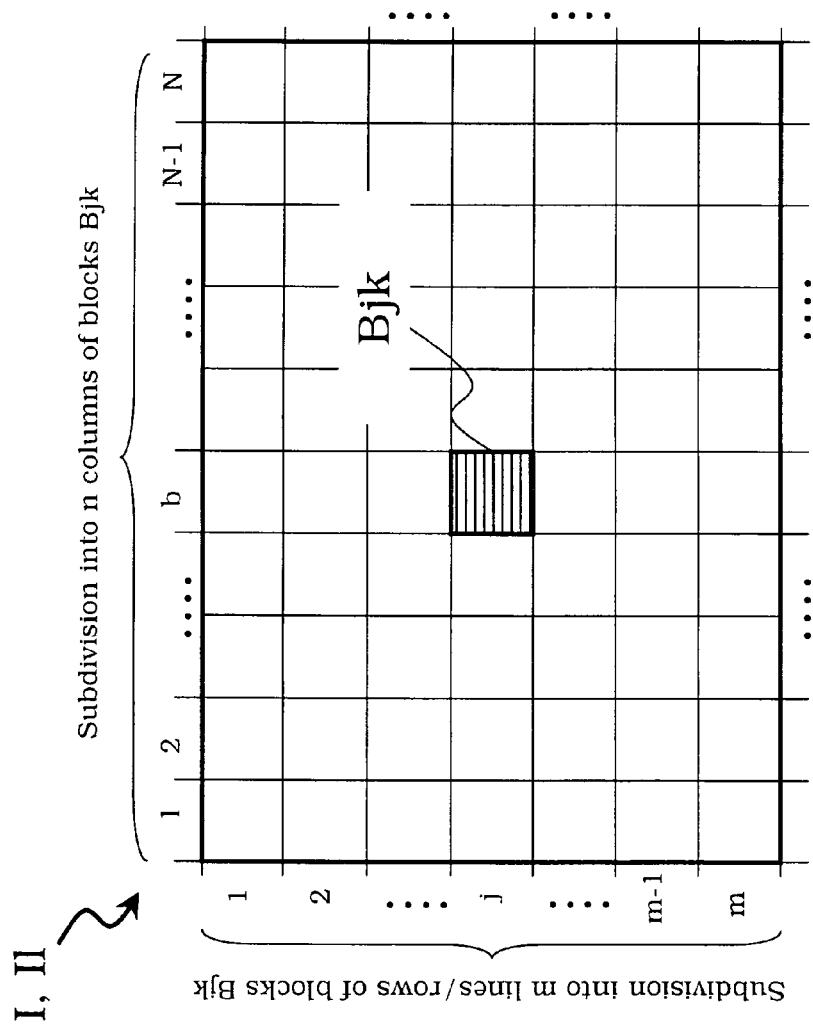
Fig. 20 - Subdivision into Blocks

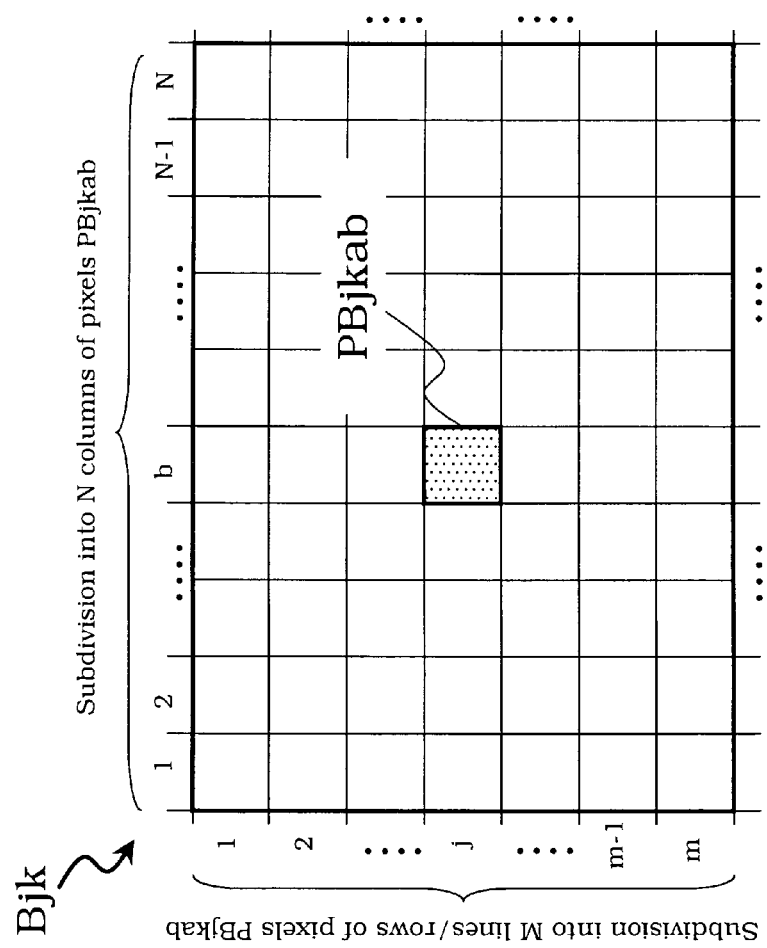
Fig. 21 - Subdivision into Pixels

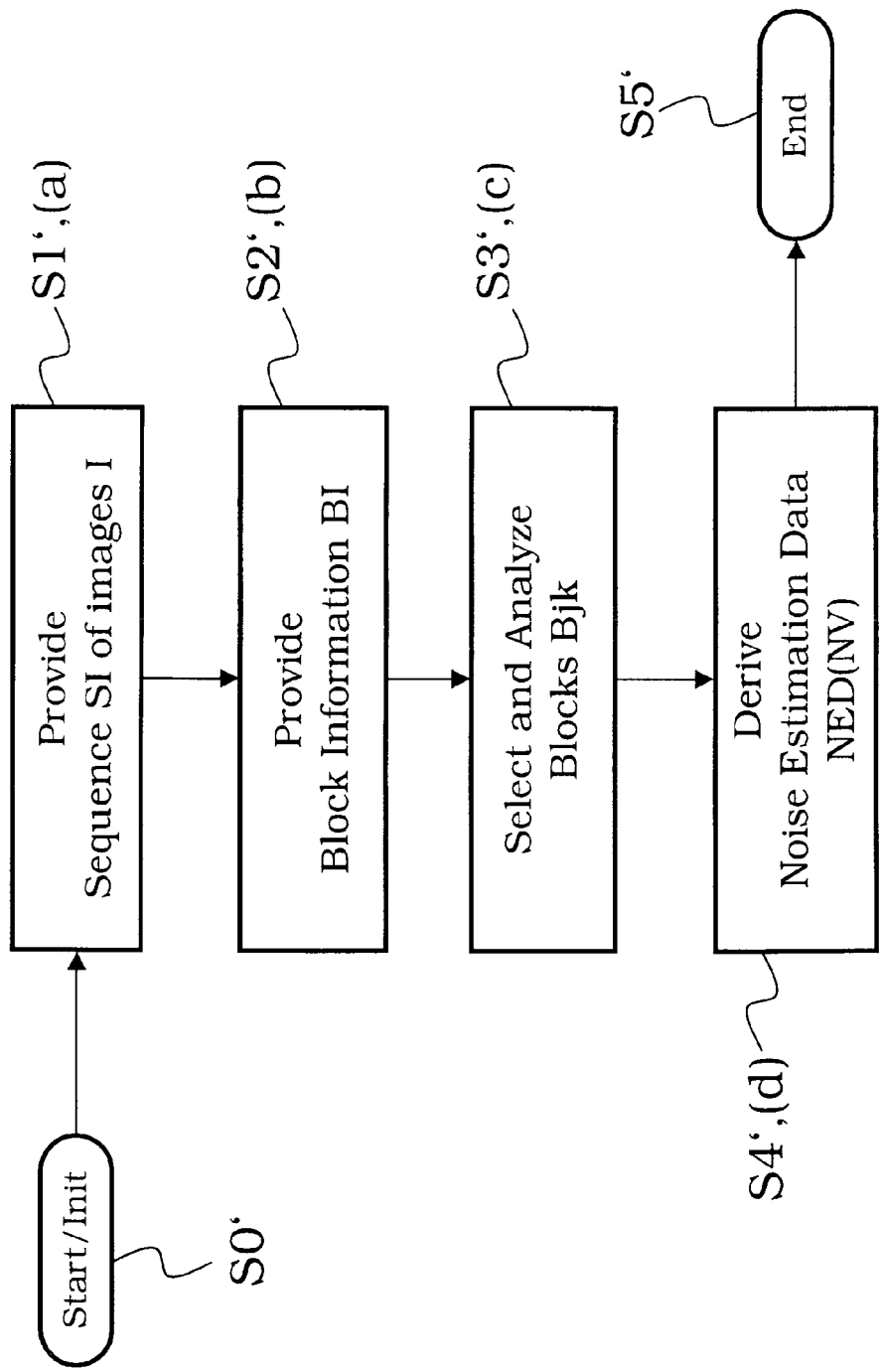
Fig. 22 - General Processing Scheme

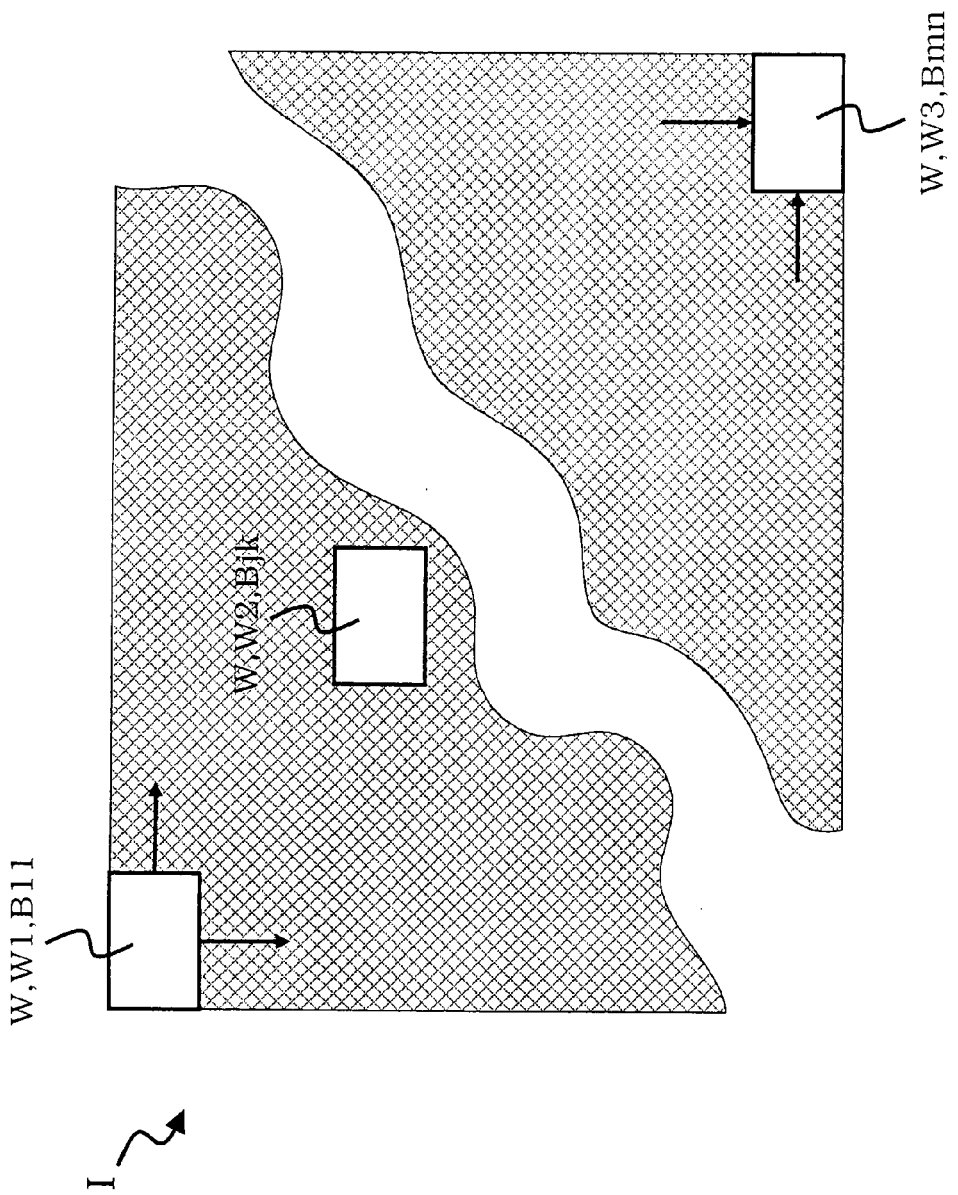
Fig. 23 - Block Construction via Gliding Window

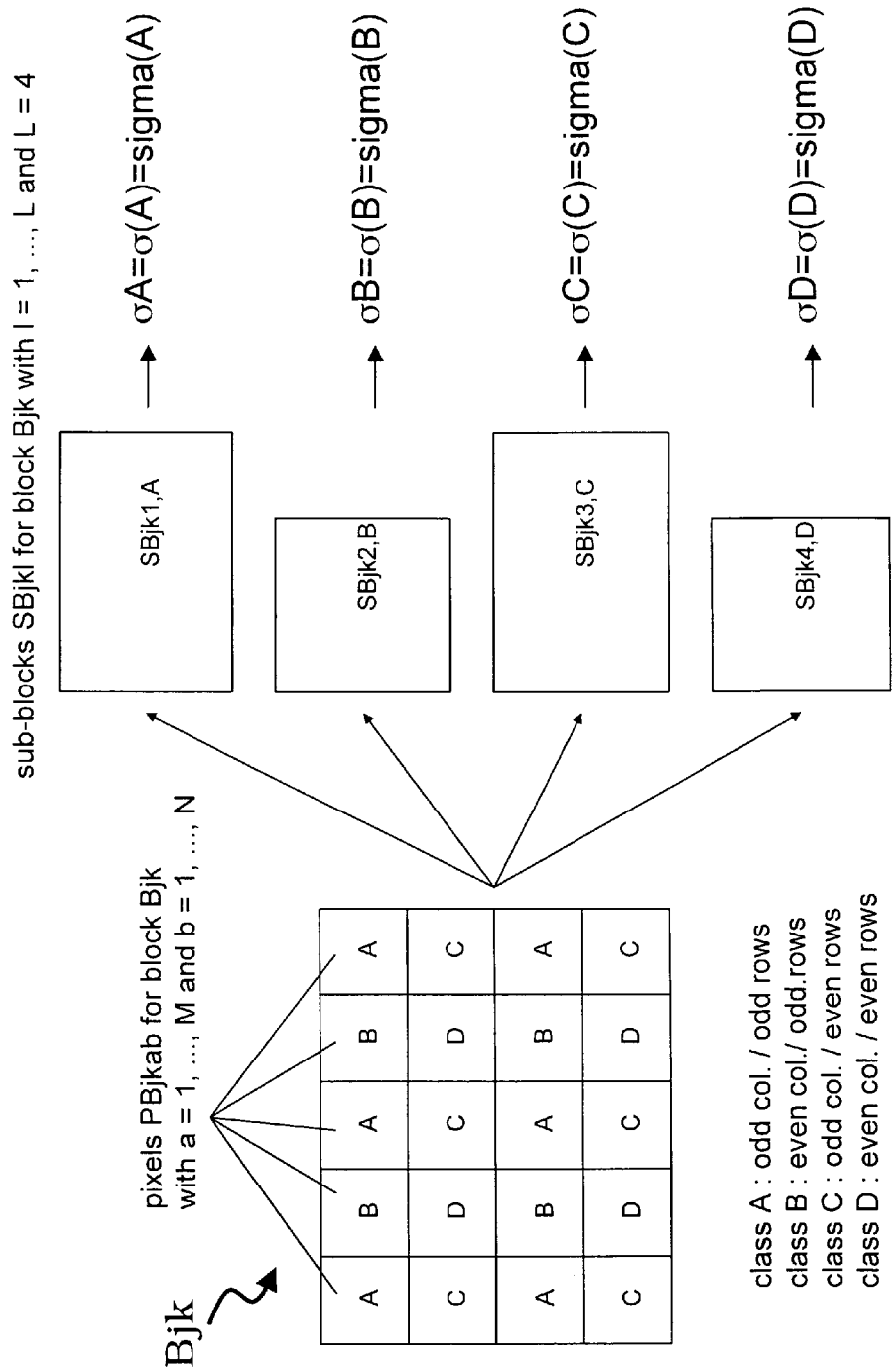
Fig. 24 - Sub-Block Construction Algorithm

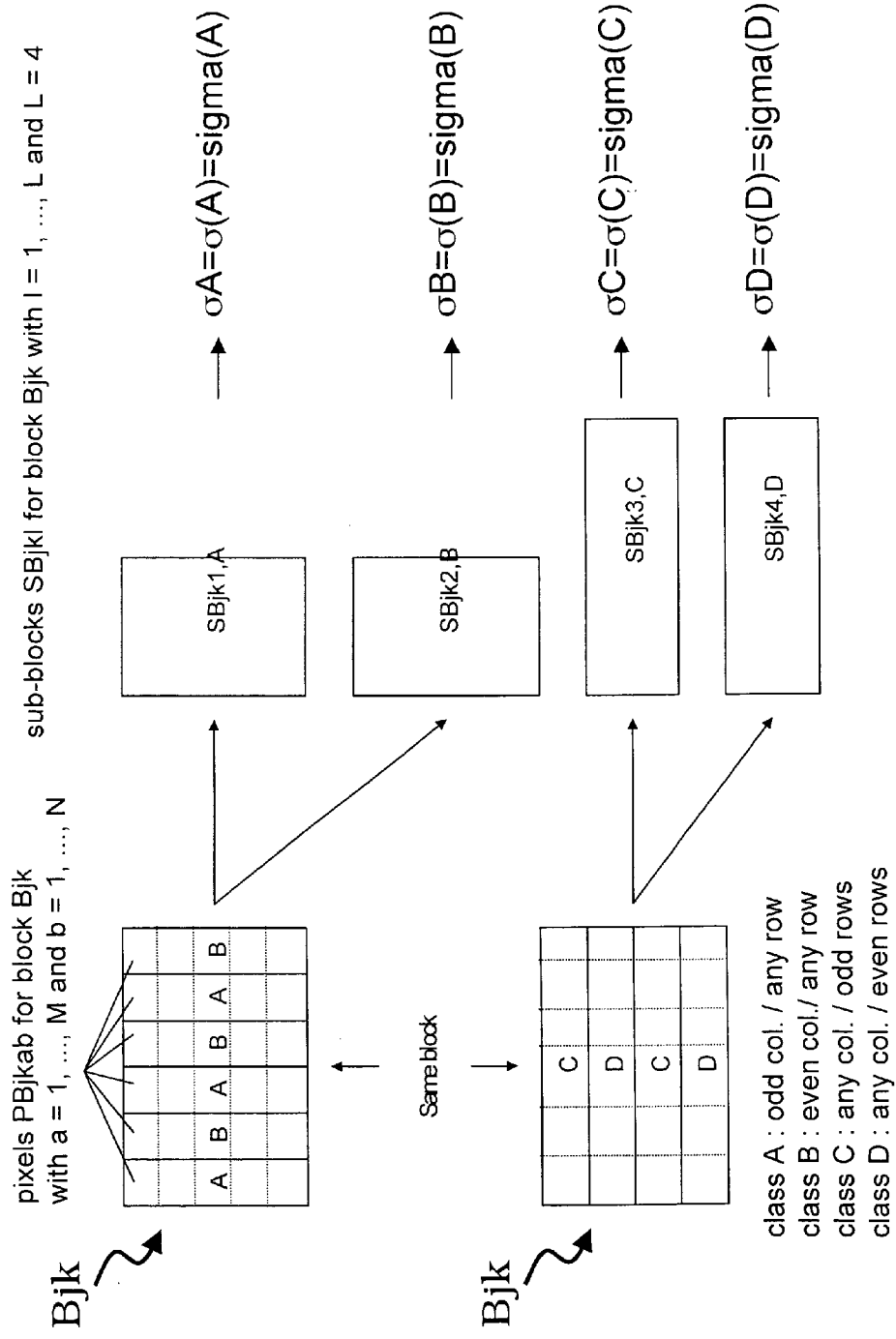
Fig. 25 - Sub-Block Construction Algorithm

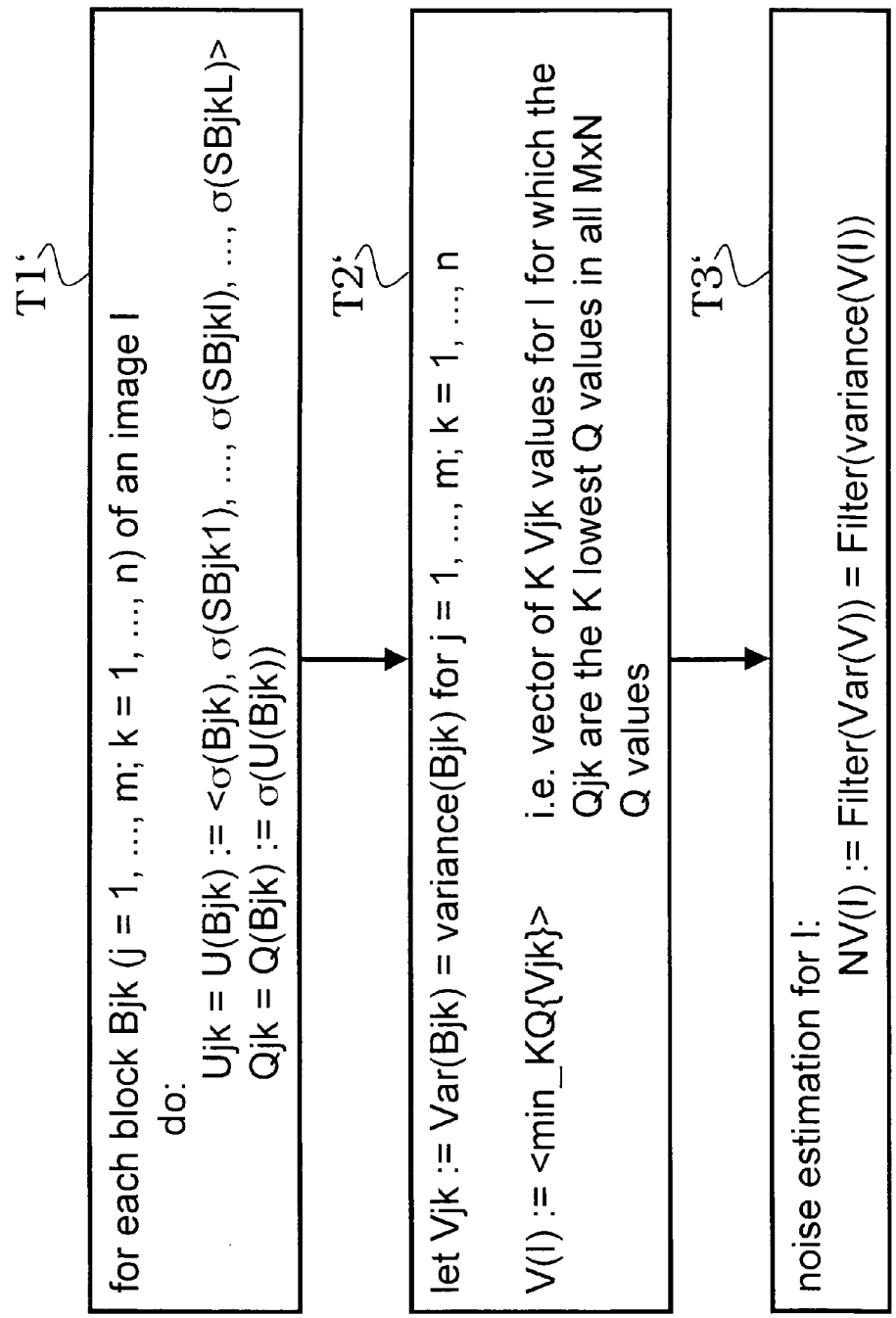
Fig. 26 - Detailed Noise Estimation Algorithm

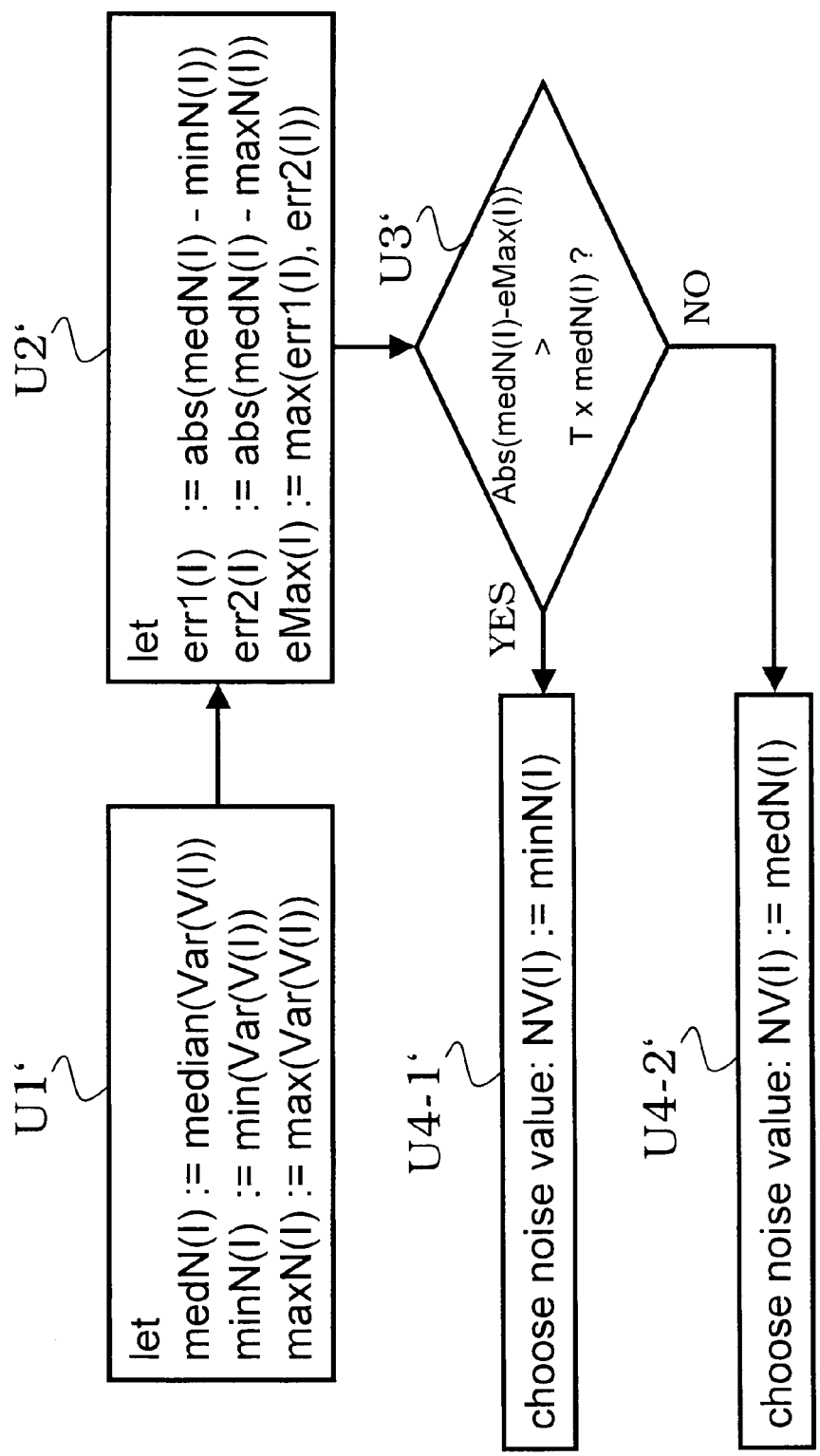
Fig. 27 - Detailed Filter Algorithm

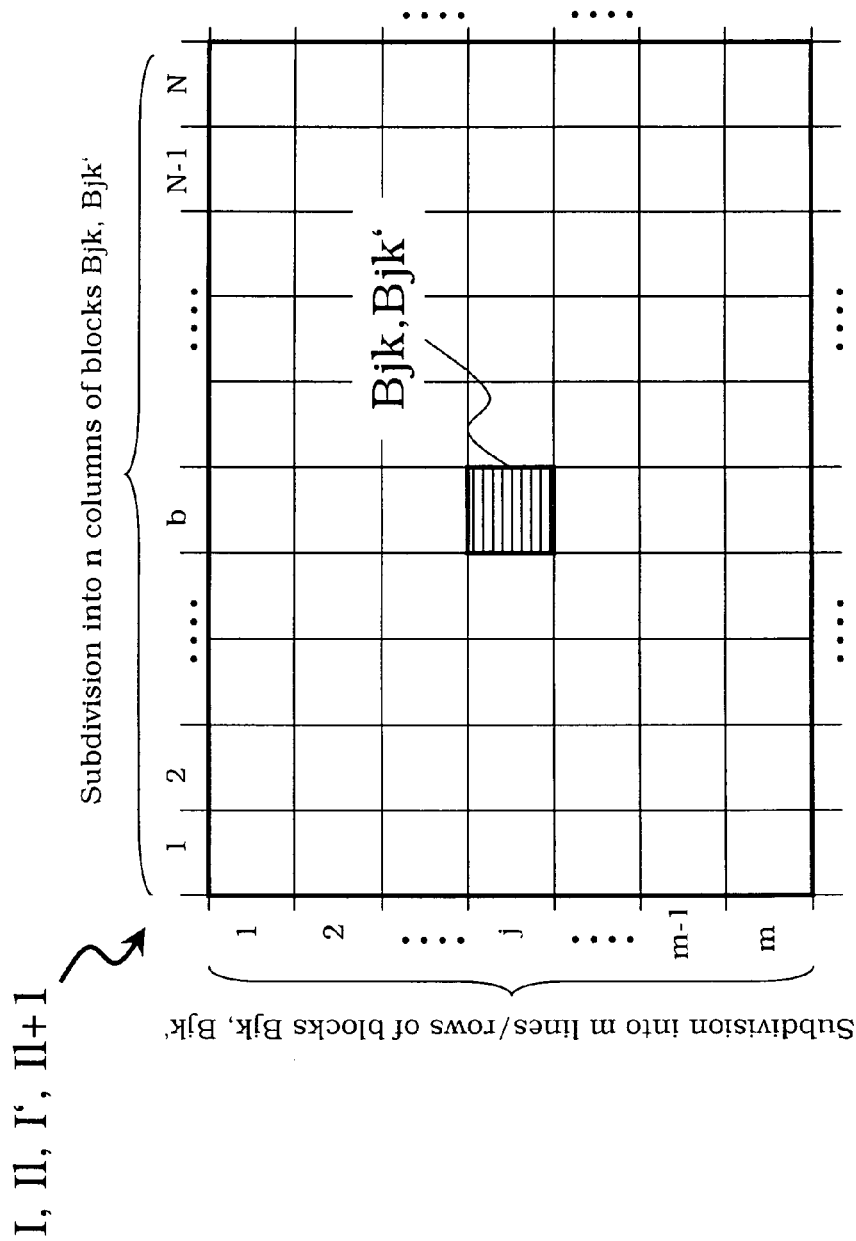
Fig. 28 - Subdivision into Blocks

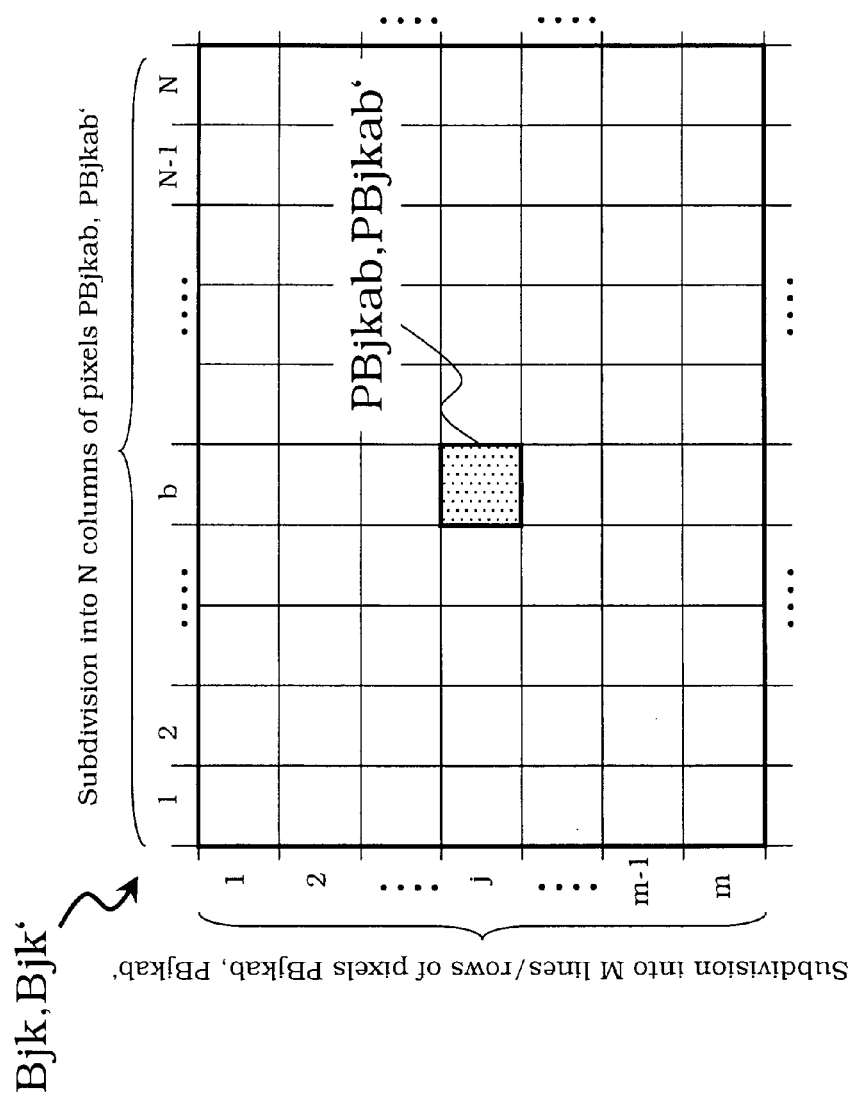
Fig. 29 - Subdivision into Pixels

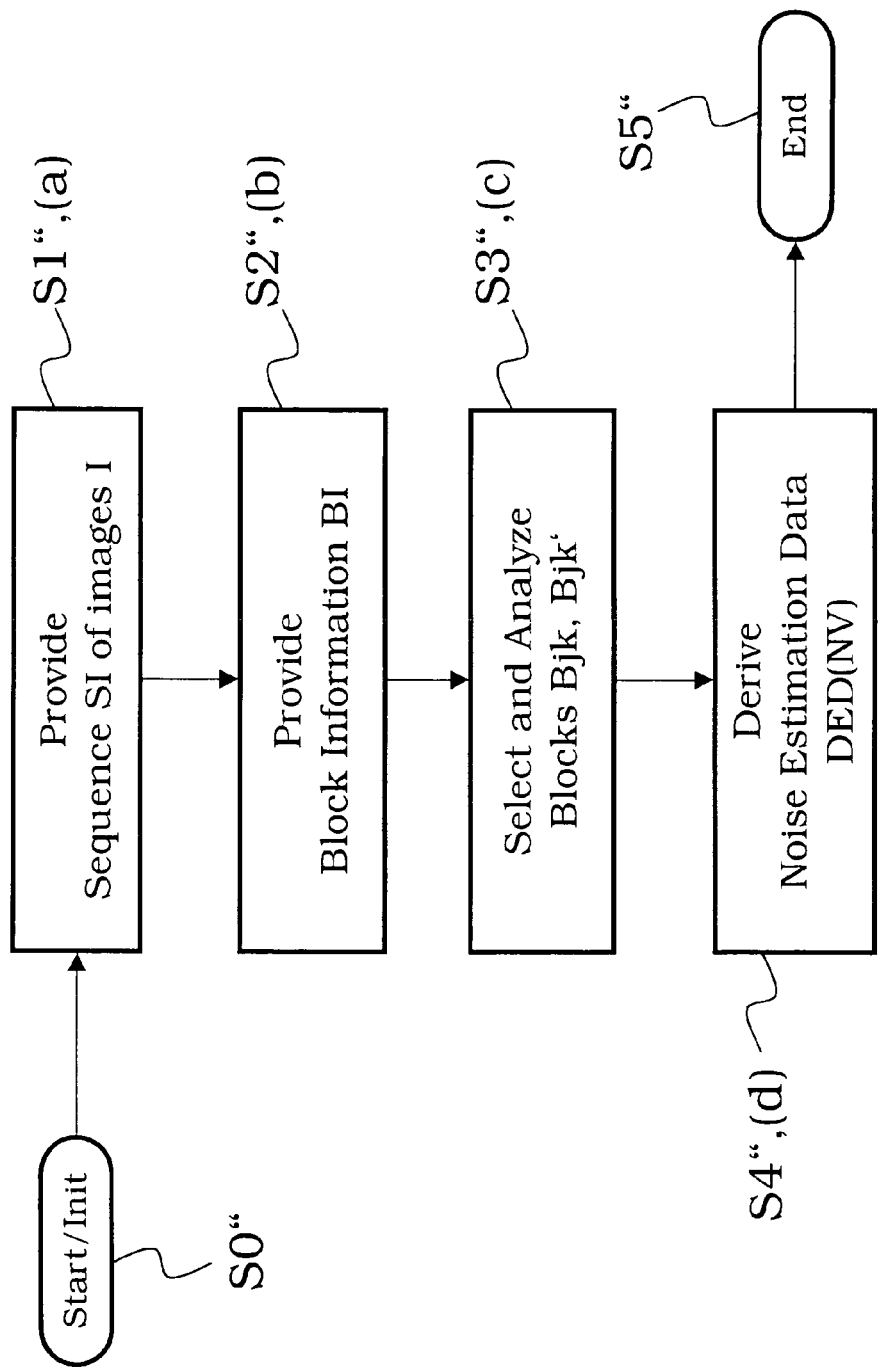

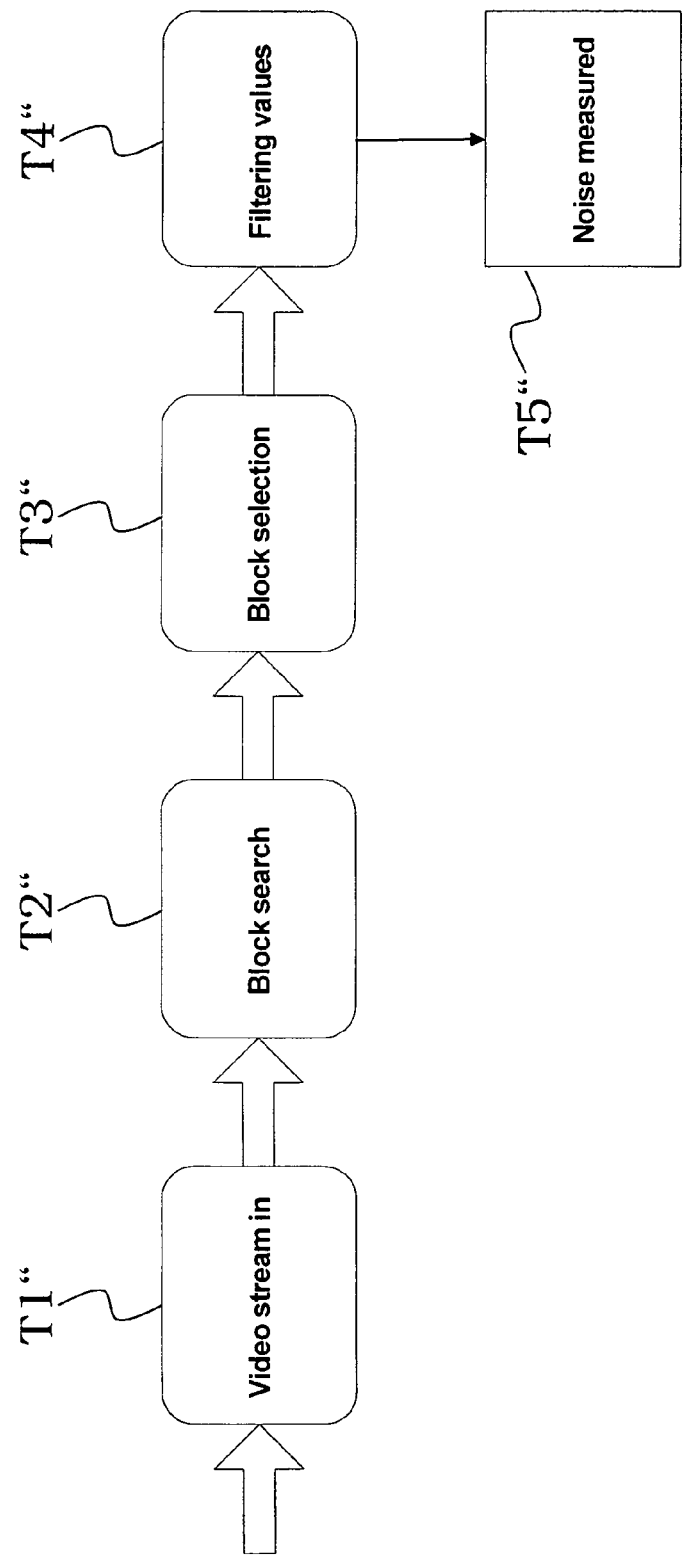
Fig. 31 - Processing Scheme

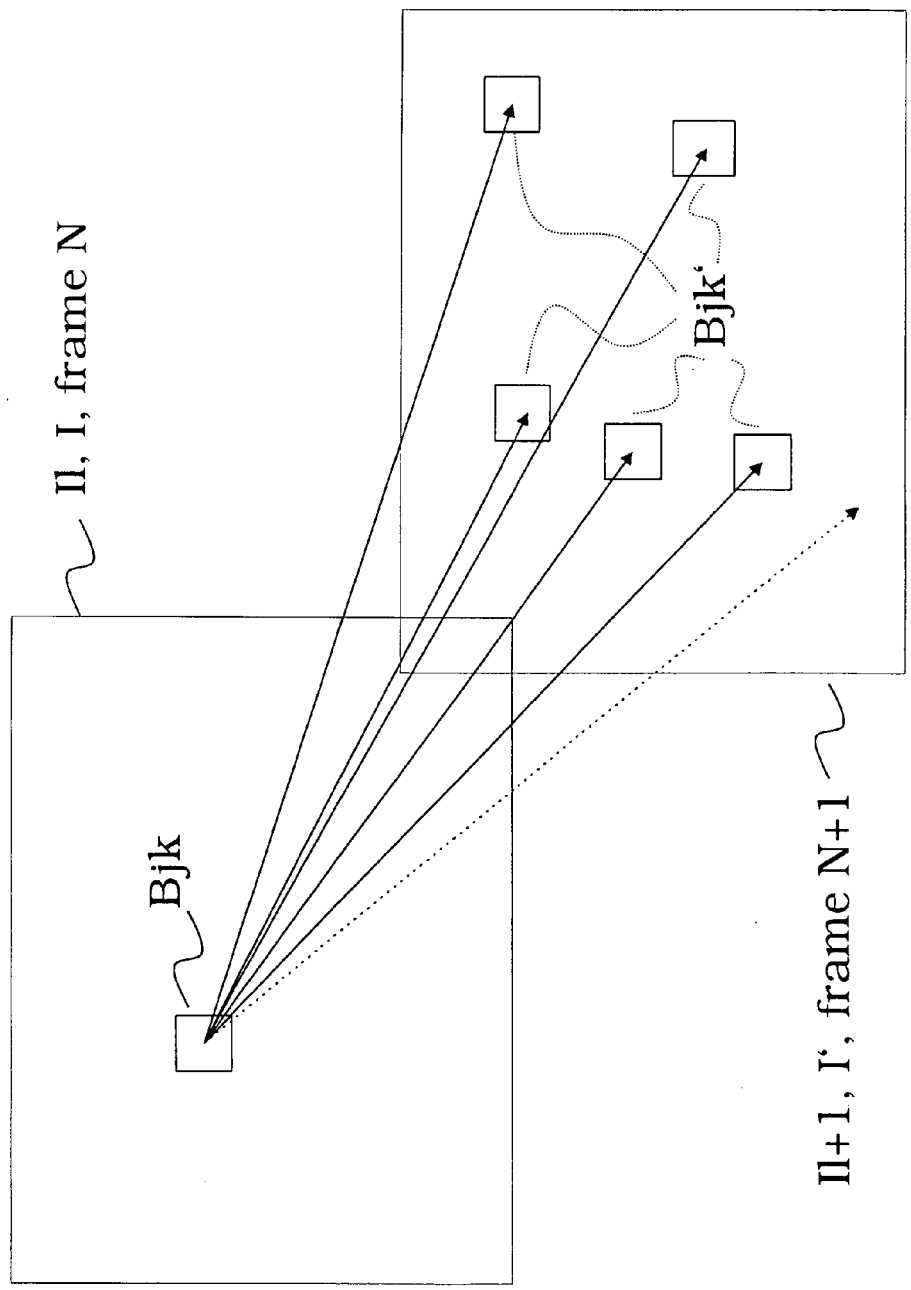
Fig. 32 - Block Search Algorithm

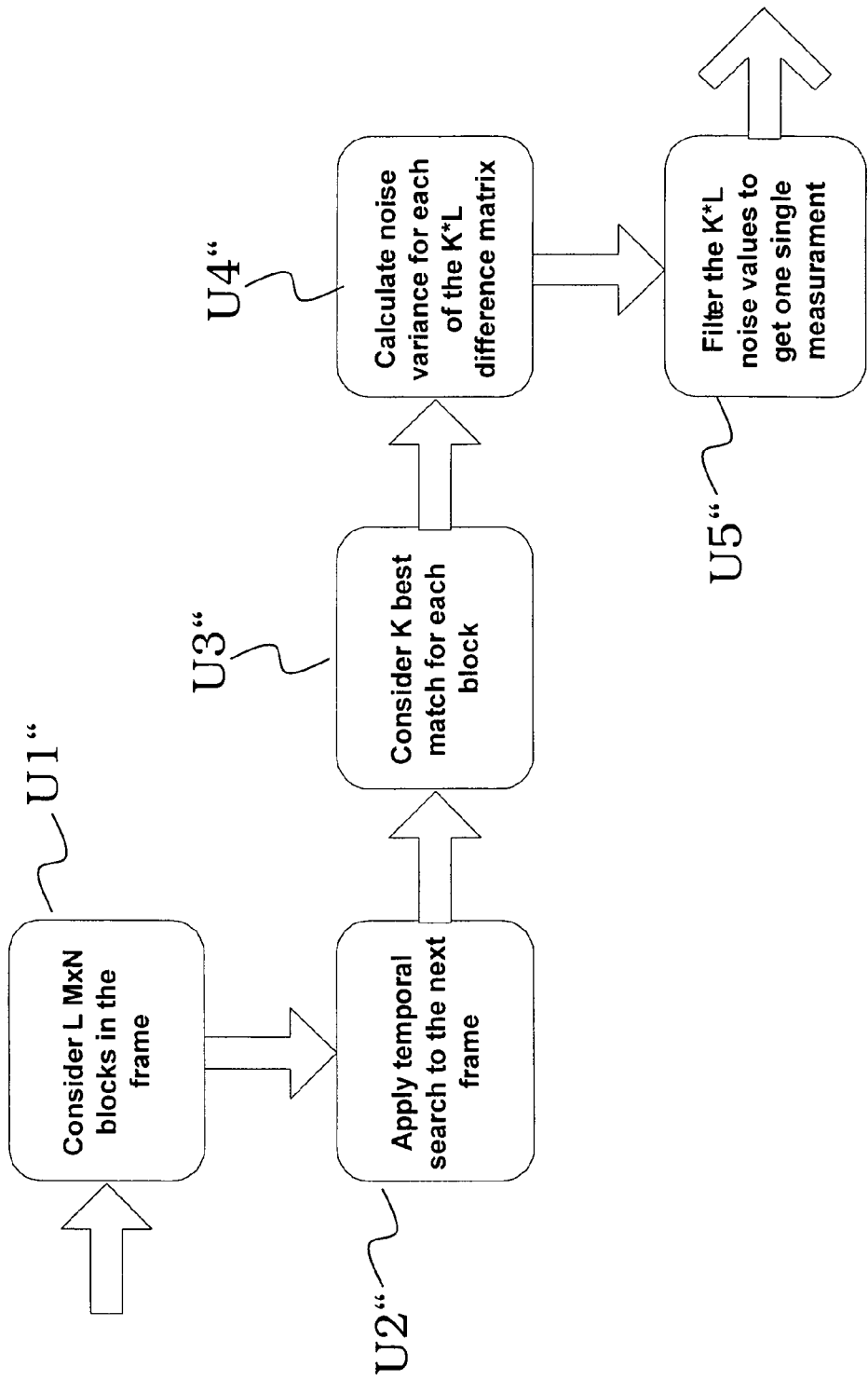
Fig. 33 - Detailed Algorithm

METHOD FOR DISCRIMINATING TEXTURES REGIONS AND HOMOGENEOUS OR FLAT REGIONS IN AN IMAGE AND METHODS FOR ESTIMATING NOISE IN AN IMAGE SEQUENCE

FIELD OF THE INVENTION

The invention relates to a method for discriminating texture regions and homogeneous or flat regions in an image. More specifically, the present invention relates to a method for determining textured and flat regions in a picture under noisy conditions.

In addition, the present invention relates to methods for estimating noise in an image or image sequence. More particular, the present invention relates multi-scale properties of noise measurements in images or pictures and/or to noise measurement by temporal de-correlation.

BACKGROUND OF THE INVENTION

In many applications and customer devices, before displaying images, pictures, or frames the underlying images, frames, or pictures and the respective data have been pre-processed in order to better adapt the image properties, and the like. One aspect is the enhancement of sharpness of the image, picture, or frame. A problem when enhancing the sharpness of an image or with respect to other pre-processing steps is that the respective process is in general applied to all image details represented by the image data. However, some of the image details indeed originate from noise components which are also contained in the image and the image data. Under a process of e.g. sharpness enhancement, also respective noise components contained in the image data will be enhanced and therefore will be amplified.

It is therefore necessary to know in advance, i.e. before pre-processing image data, to know something about the general noise level in the respective image, in particular with respect to homogeneous and textured regions of the image.

In addition, for several aspects of digital picture or digital image processing and their applications, for instance in consumer or customer devices, it is important for the respective processing or even for the application to have an estimate of the respective noise level contained in the respective images, the pictures or the respective signals conveying the same. This is in particular important for so-called noise compensation processes, for instance in image enhancement processing.

Many known noise estimation methods are comparable complicated and time-consuming on the one hand and have on the other hand problems in analysing the underlying image or picture material, i.e. it is not obvious which part of an image or of a sequence of images has to be analysed in order to obtain a realistic estimate of the noise level.

SUMMARY OF THE INVENTION

It is therefore an object of the present invention to provide a method for discriminating textured regions or texture regions and homogeneous or flat regions in an image which is capable of providing in a simple manner information about the distribution and the location of textured regions and of homogeneous or flat regions in an image.

It is an additional object of the present invention to provide methods for estimating noise in an image sequence, which is capable of providing a value for the noise level, which can be obtained in an easy and reliable manner.

The objects underlying the present invention are achieved by methods for discriminating texture regions and homogeneous or flat regions in an image, by a system, apparatus or device by a computer program product, and by a computer readable storage medium.

In addition, the objects underlying the present invention are achieved by a method for estimating noise in an image sequence according to the present invention, by an apparatus or device, by a computer program product, as well as by a computer readable storage medium.

Further, the objects underlying the present invention are achieved by a method for estimating noise in an image sequence according to the present invention, by an apparatus or device, by a computer program product, as well as by a computer readable storage medium.

Preferred embodiments are described herein.

According to a first general view and a first broadest sense of the invention, the inventive method for discriminating texture regions and homogeneous or flat regions in an image is based on the aspect that a multi-scale or multi-resolution measurement is performed in said image.

According to an alternative second general view of the present invention, the inventive method for discriminating texture regions and homogeneous or flat regions in an image is based on the aspect that the image is analyzed by using a prior measured noise value and a local variance value in said image.

According to a first solution for the objects underlying the present invention, a method for discriminating texture regions and homogeneous or flat regions in an image is provided, wherein a multi-scale or multi-resolution measurement is performed in said image.

According to a second solution for the objects underlying the present invention, a method for discriminating texture regions and homogeneous or flat regions in an image is provided, wherein said image is analyzed by using a prior measured noise value and a local variance value in said image.

In addition, the present invention proposes the following:

A first basic idea underlying the present invention according to this view is to analyse images, pictures, or frames or parts thereof in blocks in which their flatness properties and/or their noise properties are sampling invariant. The evaluation of such blocks ensures that here noise can be measured with high accuracy and confidence.

The present invention according to this view inter alia therefore suggests how such blocks can inherently be found and estimated.

The present invention according to this view suggests a method for estimating noise in an image sequence or in a sequence of images, and in particular in a video stream.

According to the present invention according to this view a method for estimating noise in an image sequence, in particular in a video stream, is provided. The method comprises (a) a step of providing S1' a sequence temporally consecutive and separated images of a given and fixed format, (b) a step of providing S2' block information which is descriptive for at least one image block, said respective image block having a given position and extension in said format, in particular for a plurality of images or for all images of said sequence of images, (c) a step of selecting and analysing S3' at least one block according to said block information for at least one image of said sequence of images, and (d) a step of deriving S4' from said analysis S3' noise estimation data for said sequence of images as a sampling and sub-sampling invariant statistical property of said at least one image of said sequence of images.

Further, the present invention proposes the following:

A second basic idea underlying the present invention according to this view is to analyze images, pictures, or frames or parts thereof which are separated in time in order to perform a processing based on the fact that noise is uncorrelated over time, while many parts of images in a sequence of images are correlated or even equal with respect to each other. Therefore, temporal differences between succeeding or temporally separated images, pictures, or frames or parts thereof can be used to obtain an estimate of the noise level contained in the sequence of images.

The present invention according to this view suggests a method for estimating noise in an image sequence or in a sequence of images, and in particular in a video stream.

According to the present invention according to this view a method for estimating noise in an image sequence, in particular in a video stream, is provided. The method comprises (a) a step of providing S1" a sequence temporally consecutive and separated images of a given and fixed format, (b) a step of providing S2" block information which is descriptive for at least one image block, said respective image block having a given position and extension in said format for a plurality of images and in particular for all images of said sequence of images, (c) a step of selecting and analyzing S3" at least one block information according to said block information for a plurality of images of said sequence of images which are temporally separated from each other in said sequence of images, and (d) a step of deriving S4" from said analyses S3" noise estimation data for said sequence of images as a temporally uncorrelated statistical property of said sequence of images.

BRIEF DESCRIPTION OF THE DRAWINGS

The invention will now be explained based on preferred embodiments thereof and by taking reference to the accompanying and schematical figures.

FIG. 1 is a schematic block diagram for elucidating basic principles underlying preferred embodiments of the present invention.

FIG. 2 is a schematic block diagram for elucidating a possible application of an embodiment of the present invention.

FIG. 3 is a schematic block diagram for elucidating in more detail some aspects underlying an embodiment of the present invention.

FIG. 4 is a schematic block diagram for elucidating aspects of a global variance level candidate generation process underlying an embodiment of the present invention.

Figure 5:
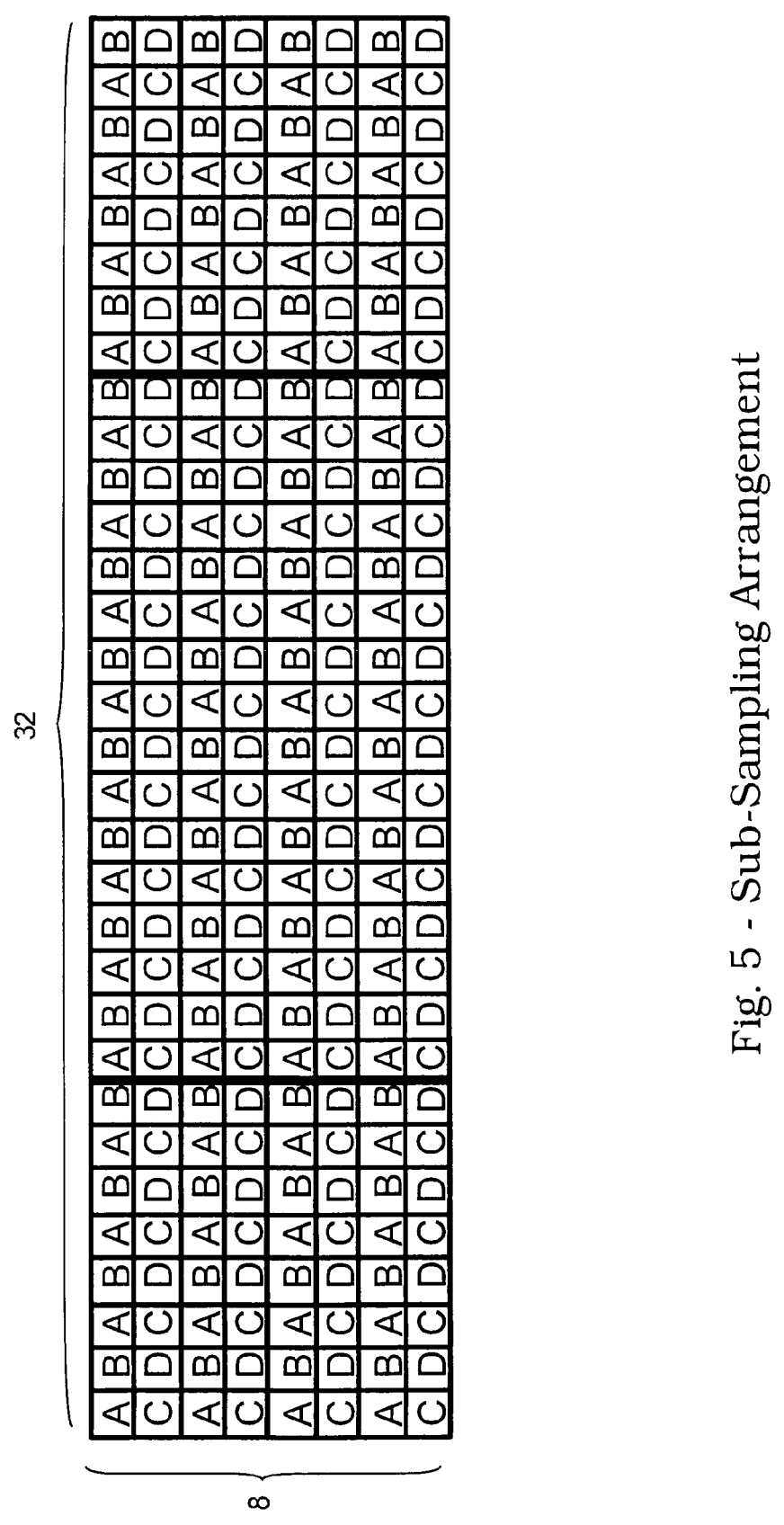

FIG. 5 is a schematic diagram for elucidating a possible sub-sampling array or arrangement underlying an embodiment of the present invention.

FIG. 6 is a schematic block diagram for elucidating a global variance level selection process underlying an embodiment of the present invention.

FIG. 7 is a schematic block diagram for elucidating a global variance level to global variance threshold conversion process underlying an embodiment of the present invention.

FIG. 8 is a schematic block diagram for elucidating a local variance determination process underlying an embodiment of the present invention.

FIG. 9 is a schematic block diagram for elucidating a flat/homogeneous texture discrimination process underlying an embodiment of the present invention.

FIG. 10 is a schematic block diagram for elucidating a flat texture cleaning process underlying an embodiment of the present invention.

FIG. 11A, 11B are schematic block diagrams for elucidating the structure of a possible arrangement process underlying an embodiment of the present invention.

FIG. 12, 13 are schematic block diagrams for elucidating a possible structure for a flat texture smoothing process underlying an embodiment of the present invention.

FIG. 14 is a schematic block diagram for elucidating a flat/homogeneous texture noise level scale process underlying an embodiment of the present invention.

FIG. 15 is a graphical representation for elucidating a possible scaling transfer function and might be used in an embodiment of a flat/homogeneous noise level scaling process as shown in FIG. 14.

FIG. 16 is a graphical representation for elucidating offset properties in a possible flat/homogeneous noise level scaling process underlying an embodiment of the present invention as shown in FIG. 14.

FIG. 17 is a schematic block diagram for elucidating a flat/homogeneous texture final linear scaling process underlying an embodiment of the present invention.

FIG. 18 is a tabular for elucidating a list of registers which might be used in an embodiment of the present invention and an implementation thereof.

FIG. 19 is a schematic diagram for elucidating the structure of a sequence of images, which is used in the present invention.

FIG. 20 is a schematic diagram for elucidating the structure of an image used in the context of the present invention.

FIG. 21 is a schematic diagram, which elucidates the structure of a block within a given image used in the context of the pre-sent invention.

FIG. 22 is a schematic block diagram for elucidating some basic aspects of a preferred embodiment of the inventive method for estimating noise in an image sequence.

FIG. 23 is a schematic representation, which demonstrates an example of selecting a block structure or an image by applying a so-called gliding window.

FIG. 24 is a schematic representation for elucidating a process of selecting sub-blocks for a given block of an image according to a preferred embodiment of the present invention.

FIG. 25 is a schematic representation for elucidating a process of selecting sub-blocks for a given block of an image according to a preferred embodiment of the present invention.

FIG. 26 is a schematic block diagram for elucidating for a preferred embodiment of the present invention a process of determining a noise value.

FIG. 27 is a schematic block diagram for elucidating for a preferred embodiment of the present invention a process of determining a noise value.

FIG. 28 is a schematical diagram for elucidating the structure of an image used in the context of the present invention.

FIG. 29 is a schematical diagram which elucidates the structure of a block within a given image used in the context of the pre-sent invention.

FIG. 30 is a schematical block diagram for elucidating some basic aspects of a preferred embodiment of the inventive method for estimating noise in an image sequence.

FIG. 31 is a schematical representation for an example of a possible processing within an embodiment of the inventive method for estimating noise in an image sequence.

FIG. 32 is a schematical representation of two succeeding images, pictures or frames for elucidating the principle of the search for blocks.

FIG. 33 is a schematic block diagram for elucidating details of an embodiment of the noise estimating algorithm.

DETAILED DESCRIPTION OF THE INVENTION

In the following functional and structural similar or equivalent element structures will be denoted with the same reference symbols. Not in each case of their occurrence a detailed description will be repeated.

According to a first aspect of the present invention a method for discriminating texture regions and homogeneous or flat regions in an image is provided, wherein a multi-scale or multi-resolution measurement is performed in or with respect to said image.

Said image may be analyzed by using a prior measured noise value and a local variance value in or with respect to said image.

According to a second aspect of the present invention a method for discriminating texture regions and homogeneous or flat regions in an image is provided, wherein said image may analyzed by using a prior measured noise value and a local variance value in or with respect to said image.

A multi-scale or multi-resolution measurement may be performed in or with respect to said image.

Said multi-scale measurement or said multi-resolution measurement may be performed in order to obtain a real noise level or real noise level value, in particular as a variance value for said image.

An image region of said image may be classified as textured if a variance value or local variance value exceeds a given threshold value.

An image region of said image may be classified as homogeneous or flat if a variance value or a local variance value is below or equals a given threshold value.

A noise variance value—in particular said prior measured variance value—or a derivative thereof may be used as said threshold value.

Homogeneous-texture discrimination data may be generated and provided, which are descriptive and discriminating textured image regions and homogeneous or flat image regions in said image, wherein said homogeneous-texture discrimination data are in particular given as a homogeneous-texture discrimination map.

The inventive method may comprise a global variance level calculating process, wherein blocks of said image are defined as image regions and assigned to a respective certain class of blocks, wherein for each class of blocks of said image a sub-variance value is determined, wherein an overall variance value for said image is determined, and wherein said sub-variance values for said classes of blocks of said image and said overall variance value for said image are taken as variance value candidates for describing the noise level or global noise level of said image.

The inventive method may comprise a global variance selection process, wherein from said variance value candidates one value is selected for describing the noise level or the global noise level of said image, in particular according to given selection criteria.

An adaptive median filter process may be used to realize said selection criteria.

A temporal filtering process may be applied to said selected global noise level value, in particular to temporally stabilize said global noise level value for said image.

A IIR filtering process may be used within said or as said temporal filtering process.

For analyzing said image, said image may be subdivided into blocks as image regions which are essentially centrally located around a respective pixel within said image.

Each block, each pixel in said image or block and/or classes thereof may get assigned a respective local variance value.

Based on pixels within said image local variance values assigned to each of said pixels are compared against said global variance value.

Said generated homogeneous-texture discrimination data and in particular said homogeneous-texture discrimination map may be cleaned in order to improve its homogeneity to thereby avoid side effects.

In said cleaning process small spots within homogeneous sections may be removed.

The inventive method may comprise a homogeneous-texture smoothing process with respect to said homogeneous-texture discrimination data, which is adapted and performed in order to smoothen transitions in said homogeneous-texture discrimination data.

A vertical IIR filter may be used for said or in said homogeneous-texture smoothing process.

A low pass filtering process is used in or for said homogeneous-texture smoothing process.

The inventive method may comprise a homogeneous-texture noise level scale process.

The inventive method may comprise a homogeneous-texture linear scale process, in order to provide optimization parameters.

According to a further aspect of the present invention a system, apparatus or device for discriminating texture regions and homogeneous regions in an image are provided, which are adapted and which comprises means for carrying out a method for discriminating textured regions and homogeneous regions in an image according to the present invention and the steps thereof.

According to a further aspect of the present invention a computer program product is provided, comprising a computer program means which is arranged and adapted in order to perform and realize a method for discriminating texture regions and homogeneous regions in an image according to the present invention and the steps thereof when it is executed on a computer or a digital signal processing means.

According to a still further aspect of the present invention a computer readable storage medium is provided which comprises a computer program product according to the present invention.

In addition, the present invention also proposes the following:

According to the present invention a method for estimating noise in an image sequence, in particular in a video stream, is provided. The method comprises (a) a step of providing S1' a sequence SI temporally consecutive and separated images I of a given and fixed format, (b) a step of providing S2' block information BI which is descriptive for at least one image block Bjk, said respective image block Bjk having a given position and extension in said format, in particular for a plurality of images I or for all images I of said sequence SI of images I, (c) a step of selecting and analysing S3' at least one block Bjk according to said block information BI for at least one image I of said sequence SI of images I, and (d) a step of deriving S4' from said analysis S3' noise estimation data NED for said sequence SI of images I as a sampling and sub-sampling invariant statistical property of said at least one image I of said sequence SI of images I.

In said step (c) a number of L blocks Bjk may be selected, with L being an integer.

Said set of L blocks Bjk may cover the respective image I completely.

Each of said blocks Bjk may be given by a respective number of M×N picture elements or pixels PBjkab, with M, N being integers.

For each of said blocks Bjk said respective number of M×N picture elements or pixels PBjkab and/or the respective extension of the blocks Bjk may be identical.

For each of said blocks Bjk said respective number of M×N picture elements or pixels PBjkab and/or the respective extension of the blocks Bjk may be chosen in order to fulfil respective coverage criterion and/or a respective overlap criterion for the blocks Bjk with respect to the respective image I and with respect to each other, respectively.

Said blocks Bjk may be non-overlapping with respect to a given image I.

Said blocks Bjk may also be overlapping with respect to a given image I.

For each of said selected blocks Bjk one or a plurality of sub-blocks SBjkl or sub-samplings SBjkl may be defined and evaluated.

The respective sub-blocks SBjkl or sub-samplings SBjkl may be defined and evaluated according to a certain uniformity criterion.

Said uniformity criterion may be descriptive for the preservation of at least one of the group consisting of flatness and white noise.

Each of said respective sub-blocks SBjkl or sub-samplings SBjkl may be defined as a block of selected rows of pixels PBjkab, selected columns of pixels PBjkab and/or selected distinct pixels PBjkab of the respective block Bjk underlying the respective sub-block SBjkl or sub-sampling SBjkl.

Each of said respective sub-blocks SBjkl or sub-samplings SBjkl may be defined as a block of selected rows of pixels PBjkab, selected columns of pixels PBjkab and/or selected distinct pixels PBjkab of the respective block Bjk underlying the respective sub-block SBjkl or sub-sampling SBjkl and obeying one of the conditions of the group consisting of

- having even row coordinates x and having even column coordinates y,
- having even row coordinates x and having odd column coordinates y,
- having odd row coordinates x and having even column coordinates y,
- having odd row coordinates x and having odd column coordinates y.
- having even row coordinates x and having any column coordinates y,
- having any row coordinates x and having even column coordinates y,
- having odd row coordinates x and having any column coordinates y, and
- having any row coordinates x and having odd column coordinates y.

For each of said sub-blocks SBjkl as well for the original block Bjk a respective uniformity value or uniformity parameter U(SBjkl), U(Bjk) may be derived.

The respective uniformity value or uniformity parameter U(SBjkl), U(Bjk) may be derived based on at least one of the group uniformity functions consisting of statistical functions, variance, co-occurrence matrix homogeneity and co-occurrence matrix histogram.

Based on said uniformity values or uniformity parameters U(SBjkl), U(Bjk) a uniformity vector Ujk, U(Bjk) for the underlying block Bjk may be defined, in particular according to the following formula (I):

$$Ujk := U(Bjk) := \langle \sigma(SBjk1), \ldots, \sigma(SBjk1), \ldots, \sigma(SBjkL) \rangle, \quad (I)$$

wherein Bjk denotes the respective block in question, SBjkl for l=1, ..., L denote the respective sub-blocks of the block Bjk, Ujk and U(Bjk) denote the respective uniformity vector for the respective block Bjk, and σ(.) denotes an underlying uniformity function.

Based on said uniformity vector Ujk, U(Bjk) for the underlying block Bjk a quality estimation value Qjk, Q(Bjk) for the respective block may be derived, in particular according to the following formula (II):

$$Qjk := Q(Bjk) := \sigma(U(Bjk)), \quad (II)$$

wherein Bjk denotes the respective block in question, Qjk and Q(Bjk) denote the respective quality estimation value for the respective block BJK, Ujk and U(Bjk) denote the respective uniformity vector for the respective block Bjk, and σ(.) denotes the underlying quality estimation function.

Based on the blocks Bjk of the image I or a sub-set thereof a variance vector V, V(I) for the image I in question may be derived, in particular as a vector of variances or variance values Vjk, Vjk(I), Var(Bjk) of the respective blocks Bjk, in particular according to the following formulas (III) and (IV):

$$Vjk = Vjk(I) := Var(Bjk) := \text{variance}(Bjk), \quad (III)$$

wherein Bjk denotes a respective block of the underlying image I, Vjk and Vjk(I) denote the respective variance value for the respective block Bjk, V, V(I) denote the respective variance vector of the underlying image I, and Var(.) or variance(.) denote the underlying variance function.

Said variance vector V, V(I) may be formed as a vector of K entries, K being an integer and the entries being variance values Vjk, Vjk(I) of the respective blocks Bjk of the underlying image I having the K lowest quality estimation values Qjk, Qjk(I), in particular according to the following formula (IV):

$$V = V(I) := \langle \min\_KQ\{Vjk(I)\} \rangle, \quad (IV)$$

wherein Vjk(I) denotes the respective variance value for the respective block Bjk, V, V(I) denote the respective variance vector of the underlying image I, min_KG{.} denotes a function that derives from a given set of variance values Vjk(I) of the underlying image I a sub-set of K variance values Vjk for which the respective corresponding blocks Bjk of the underlying image I have the K lowest quality estimation values Qjk, and <.> denotes a function forming from a given set of K values a respective K-tuple or vector with K entries.

From said variance vector V, V(I) for the underlying image I a noise value NV, NV(I) may be derived, in particular as a filtered variance of said variance vector V, V(I), in particular according to the following formula (V).

$$NV = NV(I) := \text{Filter}(Var(V(I))) = \text{Filter}(\text{variance}(V(I))), \quad (V)$$

wherein NV, NV(I) denote the noise value for the underlying image I, Var(.), variance(.) denote a function deriving a variance value for the variance vector V, V(I) of the underlying image I, and Filter(.) denotes a respective filter process or function.

The filter process or filter function Filter may be defined according to the following formulas (VI)-(XI), (XIII), and (XIV):

$$medN(I) := \text{median}(Var(V(I))) = \text{median}(\text{variance}(V(I))), \quad (VI)$$

$$minN(I) := \min(Var(V(I))) = \min(\text{variance}(V(I))) \quad (VII)$$

$$maxN(I) := \max(Var(V(I))) = \max(\text{variance}(V(I))), \quad (VIII)$$

$$err1(I) := abs(medN(I) - minN(I)), \quad (IX)$$

$$err2(I) := abs(medN(I) - maxN(I)), \quad (X)$$

$$e\text{Max}(I) := \max(err1(I), err2(I)),\qquad(XI)$$

and $$\text{noise}(I) = NV(I) := \qquad(XIII, XIV)$$
$$\begin{cases} \min N(I) & \text{if } \text{abs}(\text{med}N(I) - e\text{Max}(I)) > T\cdot \text{med}N(I) \\ \text{med}N(I) & \text{otherwise.} \end{cases}$$

wherein I denotes the underlying image, noise(.), NV(.) denote the noise value to be derived for the underlying image I, V(.) denotes the variance vector for the underlying image I, medN(.), minN(.) and maxN(.) denoted a median, minimum, and maximum noise values for the underlying image I, respectively, and Var(.) and variance(.)a function deriving a variance value for the variance vector V, V(I) of the underlying image I.

According to a another aspect of the present invention a system, apparatus or device is provided for estimating noise in a sequence of images which are adapted and which comprise means for realizing and performing a method for estimating noise in a sequence of images according to the present invention and the steps thereof.

According to a further aspect of the present invention a computer program product is provided which comprises computer program means which is adapted and arranged in order to perform and realize a method according to the present invention and the steps thereof when it is executed on a computer or on a digital signal processing means.

According to a still further aspect of the present invention a computer readable storage medium is provided which comprises a computer program product according to the present invention.

Further, the present invention proposes the following:

According to this view the present invention a method for estimating noise in an image sequence, in particular in a video stream, is provided. The method comprises (a) a step of providing S1" a sequence SI temporally consecutive and separated images I, I' of a given and fixed format, (b) a step of providing S2" block information BI which is descriptive for at least one image block B, said respective image block B having a given position and extension in said format for a plurality of images I and in particular for all images I of said sequence SI of images I, (c) a step of selecting and analyzing S3" at least one block B according to said block information BI for a plurality of images I of said sequence SI of images which are temporally separated from each other in said sequence SI of images I, and (d) a step of deriving S4" from said analyses S3" noise estimation data NED for said sequence SI of images I as a temporally uncorrelated statistical property of said sequence SI of images I.

A plurality of two images I, I', I1, I1+1 may be chosen for performing said step (c) and said step (d).

Said two images I, I', I1, I1+1) may be next neighbours—denoted as I1, I1+1—in time in said sequence SI of images I.

In said step (c) a number of L blocks Bjk, Bjk' may be selected, with L being an integer.

Said set of L blocks Bjk, Bjk' may cover the respective image I, I' completely.

Each of said blocks Bjk, Bjk' may be given by a—in particular same or identical—number M×N of pixels or picture elements PBjkab, PBjkab', with M, N being integers.

Said blocks Bjk, Bjk' may be one of overlapping and non-overlapping.

Said blocks Bjk, Bjk' may correspond to each other with respect to the position and/or with respect to the extension between different images I, I', I1, I1+1.

For each of said selected L blocks Bjk of a first, source or preceding image I, I1 and respective selected L blocks Bjk' of a second, target or succeeding image I', I1+1 an error function value Ejk based on an error function Φ between a block or source block Bjk of said first, source or preceding image I, I1 and a corresponding target block Bjk' of at least one second, target or succeeding image I', I1+1 may be determined.

Said error function Φ may be chosen to evaluate a direct pixel by pixel difference.

Said error function Φ and its values Ejk may be defined by the following formula (1)

$$Ejk = \sum_{a,b} \|PBjkab' - PBjkab\|^n,\qquad(1)$$

with Ejk denoting the error function value, PBjkab denoting a pixel or pixel value of a source block Bjk of a first, source or preceding image I, I1, with PBjkab' denoting a pixel or pixel value of the corresponding target block Bjk' of a second, target or succeeding image I', I1+1, the summation ranging over all indices a=1, ..., M, b=1, ..., N and with n=1 or n=2.

In the target image I', I1+1 K best target blocks Bjk' leading to K best error function values Ejk may be selected, with K<L being an integer.

K×L difference matrices Drstu may be evaluated, which are constructed via a direct pixel by pixel difference between each of the K selected target blocks Bjk' of the second, target or succeeding image I', I1+1 and the L selected source blocks Bjk of the first, source or preceding image I, I1.

Variances Var of the difference matrices Drstu may be determined and used as a basis for determining a noise value NV in the sequence SI of images I.

A minimum min of the variances Var of the difference matrices Drstu may be used as a noise value NV, in particular according to the following formula (2)

$$NV = \min_{K\times L}\{\text{Var}(Drstu)\},\qquad(2)$$

wherein the difference matrices Drstu are given by the following formula (2a)

$$Drstu = Btu' - Brs,\text{ and}\qquad(2a)$$

wherein Brs is one of L selected source blocks a preceding image I, I1 and Btu' is one of the K selected target blocks of a succeeding image I', I1+1.

According to a another aspect of the present invention a system, apparatus or device is provided for estimating noise in a sequence of images which are adapted and which comprise means for realizing and performing a method for estimating noise in a sequence of images according to the present invention and the steps thereof.

According to a further aspect of the present invention a computer program product is provided which comprises computer program means which is adapted and arranged in order to perform and realize a method according to the present invention and the steps thereof when it is executed on a computer or on a digital signal processing means.

According to a still further aspect of the present invention a computer readable storage medium is provided which comprises a computer program product according to the present invention.

These and further aspects of the present invention will be further discussed in the following:

The present invention inter alia also relates to a method to determine and discriminate textured and flat regions within an image, frame, or picture under noisy conditions.

The problem to be solved is to provide a reliable method to distinguish in images, frames, or pictures textured areas from flat areas under noise free conditions and under noisy conditions. Such information can be used in different image, frame, or picture improvement application like noise reduction, sharp-ness enhancement or any other.

The problem of distinguishing texture from homogenous areas under noisy conditions is, that the noise can make the homogonous area also look like texture. Depending on the decision criteria, such areas cannot be distinguished any more reliably.

In the following a first and short overview over several aspects of the present invention is given.

Short Overview

In the current embodiment, the Flat Texture (FT) process or algorithm is used in combination with a sharpness enhancement process or algorithm. The block S in FIG. 2 is the actual controlling block of this sharpness enhancement process or algorithm by means of utilizing the FT information. The target is to lower the enhancement factor of the sharpness enhancement process or algorithm in case of noise in homogenous areas in order to avoid an unwanted enhancement of noise in this areas. In textured regions, the sharpness enhancement level can be kept even under noisy conditions because the noise is masked by the human eye.

In the case of FIG. 2 the processing does not necessarily have to work on luminance lum, this is just the one appropriate embodiment here. It could work also on RGB or other domains where three separate processes are done and at the end combined or the like.

Of course it can be used in combination with other picture processing system like noise reduction, where a different configuration could be used in case of texture and homogenous areas.

Another possibility is to also in case of texture synthesis or scaling methods.

In the following a overview over some basic aspects of an embodiment of the present invention is given:

gvlCandidates—Global Variance Level Calculation

This block or process comprises a noise measurement method, which provides the global noise level independent if the picture content contains texture or noise. This can be reached by using a multi scale measurement approach, where for a given block, four sub-variances and one overall variance is calculated. This utilizes the fact, that (Gaussian) noise is independent from the spatial position and texture (to some extend) is not. Therefore, that sub-variances should change in case of texture and they should stay similar in case of homogenous regions even in case of noisy condition. The determination of the global noise level is crucial for the system. This block outputs 5 candidates for the global variance level.

gvlSelect—Global Variance Selection

This block or process is adapted to select the best suitable global variance level from the five candidates. The method, which is actually used in our embodiment is called adaptive median.

The advantage of this adaptive median method is, that in cases where almost the whole picture is consisting of texture and only a very small region has homogenous content, the noise level will be taken from this homogenous region, although it is not the median value in the candidate list. This helped to solve some problematic cases where despite the multi-scale approach, the candidates have been wide spread in the value range. It improves the reliability of the GVL vale.

Notice

It is important to notice, that for some embodiments of the present invention as described above and below the pair of blocks or units gvicandidates and gvlSelect may be designed and/or adapted in order to serve as a noise measurement unit or block. Such a noise measurement unit or block formed by said pair of blocks or units gviCandidates and gvlSelect may be incorporated in any embodiment of the present invent whenever a noise measurement block or unit is involved.

gvl2Gvt—Global Variance Level To Global Variance Threshold

This block or process provides a temporal filtering of the GVL value in order to avoid temporal side effects like pumping. It stabilizes the GVL value by means of a IIR filter. The second task is to apply some offset and gain parameters for final adjustment of the algorithm in the real-time system.

Local Variance

This Block or Process is Adapted to Calculates the Variance of Block Centrally located around an actual pixel. Each pixel in the picture gets an variance value assigned in this way.

ftDiscriminate—Flat Texture Discriminate

This block or process is adapted to compare pixel by pixel the above mentioned local variance value against the GVT.

fTCleaning—Flat Texture Cleaning

This block or process is adapted to clean the binary flat vs. texture map to improve the homogeneity of the map, which avoids side effects. It removes small spots which are flagged as texture within a homogenous region and vice versa. Especially small areas indicated as texture within a homogenous area can lead to visible distortions for the viewer.

The erosion fits the area, which is masked as texture better the real object/region border. There is some overlap of the texture mask compared to the actual textured region in the picture due to the mask size of the local variance operator. The local variance of pixel which are still in a homogenous region but near a textured area is already increased because the mask for calculating the local variance covers already some texture pixel or pixel from another characteristic than the actual one. The erosion process is a countermeasure for this issue.

fTSmoothing—Flat Texture Smoothing

This block or process is adapted to smoothen the transitions in the binary flat vs. texture map. This is also necessary to avoid side effects for the viewer because a steep transition or binary switching of the sharpness enhancement or any other method is visible to the human eye as error. The vertical IIR filter was chosen to save implementation resources and to achieve a strong filtering also in vertical direction.

The strong low pass filtering further attenuates also the enhancement of small textured areas within a homogenous region which is of advantage for the image impression.

ftNlScale—Flat Texture Noiselevel Scale

This block or process is adapted to guarantee a certain adaptivity to the over-all noise level for the complete system. This means that if very strong noise is apparent in the picture, the textured region should be gradually, with increasing noise level, be also set to "no texture". This means in our embodiment that the sharpness enhancement is gradually completely switched off also for textured areas for very strong noise.

ftMapScale—Flat Texture Linear Scale

This block or process is adapted to provide some optimization parameters for the algorithm chain the real-time system and is not mandatory.

In the following a more detailed overview over several aspects of the present invention is given. The following passages give therefore a more detailed explanation of the flat vs.

texture video analysis component and of the underlying methods and algorithms and related implementation notes:

Overview

FIG. 1 is a schematic flow chart for elucidating some aspects of an embodiment of the method for discriminating texture regions TR and homogeneous or flat regions HR in an image I according to the present invention.

After an initialisation step S0, in a first processing section S1 digital image data ID or a derivative thereof—e.g. the luminance part—or even an image, frame or picture I as such are provided as input data inD.

In a second processing section S2 said digital image data ID, said derivative thereof—in particular said luminance part—or even said image I as such are sub-divided into blocks Bjk of image elements or pixels.

Then in a third processing section S3 a global variance or global variance value V as well as local variances or local variance values Vx with respect to said blocks Bjk or classes Cx thereof are derived. From these global and classes of local variances an estimate for the noise level or noise level value NV for the image, frame or picture I is derived.

In a fourth processing section S4 from said noise level or said noise level value NV image regions—e.g. said blocks Bjk—are locally classified as being textured—i.e. being an textured image region TR—or as being homogenous or flat—i.e. being a homogeneous image region HR.

From said classification homogeneous-texture discrimination data HTDD—e.g. a homogeneous-texture discrimination map HTDM—are derived in a following fifth processing section S5 and then output as output data outD in a sixth processing section S6.

The flat/homogeneous vs. texture image/picture analysis component or HT or FT image/picture analysis component differentiates flat from texture regions within an image, frame and/or video picture. The target for this algorithm is to deliver a map to a image/picture enhancement block, e.g. block S in FIG. 2, which uses this information to control the level of enhancement within these different image/picture regions. FIG. 2 describes this use case. In the case of a noisy input, this map helps to avoid the enhancement of noise in homogeneous or flat image/picture regions.

Register List

The HT or FT block or process depicted in the block diagram of FIG. 2 comes with a register list as shown in FIG. 19. A detailed description is given in the following sections.

Functional Description of the Homogeneous/Flat Vs. Texture Block/Process Block Diagram FIG. 3 gives an overview about the functional components which are incorporated in the reference model for the homogeneous/flat vs. texture algorithm.

This block diagram shows the software implemented reference model from a logical point of view. A hardware implementation may collapse some blocks like all gvlXxx blocks or the localVariance and the ftDiscriminate block. The parameters for all connection lines are taken from the fixed point reference model.

Parameters which are applied to the system from outside are depicted with a separate input arrow to the respective blocks.

The following sections describe each functional block by its input, output, processing steps or algorithm and some related notes for implementation.

Global Variance Level Candidate Generation—gvlCandidates

Input: Input luminance image/picture lum
Parameters: gvl_min_crit
Output: Array of 5 minimum variance values σtot[i], i={1 . . . 5}

Process/Algorithm:

The block diagram of FIG. 4 describes the gvlCandidates process/block.

The gvlCandidates process block calculates 5 global variance level (GVL) candidates with the following method:

1. Subdivide the picture into blocks B(x,y).
2. Calculate for each block B(x,y) the following values:
   a. σtot: variance for all pixel in B(x,y)
   b. σA, B, C, D: variance for all pixel on the sub-sampling raster A,B,C,D (see drawing of FIG. 5)
   c. σvar: variance of variances σA, B, C, D, tot
3. Compare σvar to the constant value fa_pen, which is a flat area penalty. If σvar<fa_pan, the σvar value is discarded and not considered in the following minimum determination because it is 'too flat' and may stem from a black bar. If σvar>fa_pan, the σvar is considered as valid and used for further processing.
4. In case that flag gvl_min_crit is enabled, σtot is assigned to σvar. With this you disable the multi-scale NM and enable the global minimum block variance search for determining the final GVL value.
5. Find the minimum values σvar for all blocks and store them together with their accompanying value σtot for the respective block B(x,y).
6. Output these five minimum σtot[i], i={1 . . . 5} to the gvlSelect module.

The sub-sampling arrangement or raster mentioned in itemt 2.c for a block B(x,y) above is described in FIG. 5.

Two different methods to calculate the variance are analyzed as follows:

1. $\sigma = 1/N * \Sigma(x(i)-\mu)^2$, for all x(i) in B(x,y), where N is the number of pel in B(x,y) and $\mu$ describes the pixel average in B(x,y). We usually refer to this value as "normal variance".
2. $\sigma = 1/N * \Sigma |x(i)-\mu|$, which describes a variance based on the absolute value of the difference between the actual sample and the average in B(x,y). This is usually referred to as "simple variance".

Investigations show that it is possible to use both types of variance calculation for our purposes. However, it was decided to use the normal variance because it is more advantageous in terms of resource usage.

Implementation Notes:

1. There is no specific border processing since the measurement blocks are placed only inside the active picture area.
2. Blocks which are not fully fitting into the active picture area are discarded.
3. For implementation we use the GVL of the previous frame for the actual picture in order to avoid a full frame delay. For the time instance t=0 the first GVL value is set to GVL(t=0)=0.
4. The bit-width for all different signals is taken from the katv_FT fixed point model. All primary variances σA, B, C, D, tot are 18 bit.
5. The flat area penalty fa_pen is set per define to 0.02 and is used to discard measurements in black bars.

Global Variance Level Selection—gvlSelect

Input: Array of variance values σtot[i], i={1 . . . 5}
Parameters: gvl_med_weight, test_mode, gvl_const
Output: Global Variance Level (GVL)

Process/Algorithm:

FIG. 6 shows the structure of the gvl2Select module. A basic principle of this process/block is to calculate some selection criteria on the 5 values σtot [i] and to pass the selected value σtot, which is named GVL, to the output.

Different methods have been investigated for the selection process like min(σtot [i]) or med(σtot [i]).

The method which is currently performing best is called adaptive median. This works like follows (refer to FIG. 6):
1. Calculate the minimum σtot,min=min(σtot[i]).
2. Calculate the median σtot,med=med(σtot[i]).
3. Calculate the distance δ[i] for each σtot [i] to σtot,med. The distance criterion is based on the absolute difference: δ[i]=dist(σtot[i], σtot,med)=Σi=1 . . . 5|σtot[i]−σtot,med|.
4. Determine the maximum from all distances δ[i]: δmax=max(δ[i]).
5. A binary decision is taken from δmax>gvl_med_weight·σtot,med. If this condition is true (1) the result will be σtot,min, otherwise the output will be σtot,med (see below notes for information on gvl_med_weight). If gvl_med_weight is set to its maximum possible value, GVL is chosen to be σtot,med. By this it is possible to switch with the help of gvl_med_weight between σtot,min and σtot,med.

Implementation Notes:

The gvl_med_weight value is a register parameter with 10 bits. In the full precision reference implementation, it is set by default to α=0.2 (fix-point model: 0.1875).

For testing the FT algorithm, a test mode has been introduced by using the parameters test_mode & gvl_const. In case that test_mode is enabled the constant value gvl_const is set as output of this block.

Global Variance Level to Global Variance Threshold Conversion—gvl2gvt

Input: Global Variance Level—GVL
Parameters: gvl2gvt_stabL . . . stabilization length, length of IIR filter
  gvl2gvt_stabW . . . stabilization weight
  gvl2gvt_gain . . . multiplication factor
  gvl2gvt_offset . . . offset value
  test_mode . . . FT test mode flag
  gvt_const . . . GVT value used in the FT test mode
Output: Global Variance Threshold GVT
  Stabilized Global Variance Threshold GVLstab
Process/Algorithm:

The basic objective for this process/block is to stabilize the GVL and to apply the tuning parameters to it in order to output the GVT. The stabilization is realized by an IIR filter. The block diagram of FIG. 7 describes the process flow.

The processing works as follows:
1. Calculate the stabilized global variance level as GVLstab=gvl2gvt_stabW·GVLstab[i]+(1−gvl2gvt_stabW)·GVL, where GVLstab[i] describes an array with gvl2gvt_stabL elements of the last stabilized GVLstabs and where GVL describes the actual incoming value. GVLstab[i] is depicted in the above drawing as IIR block.
2. Update GVLstab[i](IIR) for the next iteration.
3. Calculate the global variance threshold as GVT=gvl2gvt_gain GVLstab+gvl2gvt_offset.
4. In case the amount of counted blocks (in actual region of interest) is smaller than the register value fte_min_count_blks the GVT value is set to 0. By default the value is set to 150, which represent ⅓*⅓ SD.
5. Output GVT and GVLstab.

Implementation Notes:
1. During the run-in of the process, the averaging process is only carried out over valid values in the FIFO, which means the full length is considered after gvl2gvt_stabL frames (gvl2gvt_stabL subsequent GVL inputs).
2. The parameter gvl2gvt_stabL maps to the IIR filter length as follows:

*gvl2gvt_stabL*=0==>*IIR*−Filter length=1 Tap

*gvl2gvt_stabL*=1==>*IIR*−Filter length=2 Taps

*gvl2gvt_stabL*=2,3==>*IIR*−Filter length=4 Taps

The default value is set to gvl2gvt_stabL=2.
3. Similar to the gvlSelect block, this block features also a test mode enabled and defined by the parameters test_mode & gvt_const. In case that the test_mode is enabled the constant value gvt_const is set as output of this block.

Local Variance Determination—localVariance
Input: Luminance picture lum
Parameters: None
Output: Local variance σloc
Process/Algorithm:

This process/block is adapted to calculate the variance within a 5×5 block, centrally located around the actual position, as is shown in FIG. 8.

The process/algorithm can be described as follows.
1. Load all pixels in a 5×5 block around the actual pixel.
2. Calculate the local variance σloc over all pixels in the block with the same method as for the GVL, the "normal" variance formula.
3. Output the σloc and proceed to the next position.

Implementation note: The border handling is implemented with pixel repetition.

Homogeneous/Flat Texture Discriminate—ftDiscriminate
Input: Local variance level σloc GVT
Parameters: None
Output: Flat vs. texture map: ftmap
Process/Algorithm:

This process/functional block does the actual discrimination between homogeneous/flat and textured area by comparing the local variance value to the GVT value as described FIG. 9.

The process/algorithm behind this block is very simple:
Compare each σloc to the GVT and write a binary decision value to the output.

Implementation notes: No special considerations. This block may be collapsed (in hardware design this has been considered already) with others in a final implementation. It's separate in the simulation model for ease of use and analysis.

Homogeneous/Flat Texture Cleaning—ftCleaning
Input: Flat vs. texture map: ftmap
Parameters: None
Output: Cleaned flat vs. texture map: ftmapcl
Process/Algorithm:

The cleaning step is intended to improve the homogeneity of the FT map and to remove spurious errors. The cleaning block comprises two median filters and one erosion step as depicted in the block diagram of FIG. 10.

All applied filter methods are regular text book methods. The algorithm can be described as follows:
1. Apply a 5 tap median in horizontal direction centrally located around the actual pixel.
2. Apply a 5 tap median filter in vertical direction, centrally located around the actual pixel. The input to this filter step is pre-processed by the previous horizontal median step.
3. Apply on the horizontally and vertically median filtered map an erosion process with a squared 5×5 structure element.
4. Output the cleaned FT map values.

Implementation Notes:
1. FIGS. 11A, 11B give some hint to the current software implementation. The filter mask for the median filtering is shown in the left picture of both. The central column of the 5×5 mask is the input to the vertical 5-tap median filter.

Each of the values of this vertical mask are first horizontally median filtered by a 5-tap median, which is depicted with the horizontal extension. The numbering in front of the median operators gives some hint to the order of processing.

The right picture shows the 5×5 structure element for the erosion process. Since we have only 1 bit values, all the rank order filters in this block can be implemented by simple counters.

2. The border handling is done by pixel repetition.

Homogeneous/Flat Texture Smoothing—ftSmoothing
Input: FT map
Parameters: ftsmo_iirFeedB
Output: Horizontally and vertically smoothed FT map: ftmapHV
Process/Algorithm:

This process/block is intended to smooth out the transitions between flat and texture area in the FT map, which is crucial for the final picture quality because this reduces side effects. Different methods have been investigated.

FIGS. 12 and 13 describe the sub-components of the ftSmoothing process/block.

The process algorithm works specifically as follows:
1. Apply a horizontal filter to the incoming binary FT map. The horizontal filter applies a averaging over 17 taps centrally located around the actual one and outputs the result as ftmapH to the vertical smoothing filter.
2. The vertical filter is implemented as 2-tap IIR filter with the ftsmo_iirFeedB+ϵ parameter as weight for the feedback path. ϵ is called "feedback disturbance" and was introduced because the ftmap output does not reach the maximum valued 255 without this small offset. The ϵ value is currently set to 0.001.
3. To avoid overflow, a clipping block is introduced, which limits the map between 0 and 255.
4. The output is ftmapHV.

Implementation Notes:
1. All border processing is done with pixel repetition.
2. Also a vertical 5-tap FIR filter has been investigated, which may be integrated with the horizontal IIR filter to a squared 17×5 mask for averaging. This may be an alternative to the IIR filter, which has an 8 bit input signal at the input and therefore is more expensive. However the 2-tap IIR is preferable because it delivers a stronger smoothing.

Homogeneous/Flat Texture Noise Level Scale—ftNlScale
Input: Smoothed flat vs. texture map ftmapHV $GVL^{stab}$—Stabilized global variance level as noise level
Parameters: ftnlsc_nla—Noise level acceptance threshold ftnlsc_nlc—Noise level cut off threshold ftnlsc_nv_min—Minimum valid noise level ftnlsc_nv_max—Maximum valid noise level
Output: Noise adaptive scaled flat vs. texture map $ftmap\_nlsc^{out}$ to the enhancer component.
Process/Algorithm:

This process/module has two basic functions as depicted in FIG. 14.

The first function is to scale the maximum value of the FT map down with increasing noise level. The downscaling is currently implemented with a linear approach. If the noise level (GVLstab) is below ftnlsc_nla, no scaling of the FT map is applied. If the noise level (GVLstab) is higher than ftnlsc_nlc, the FT map is set to zero. This applies a graceful degradation of the sharpness enhancer SRC with high noise levels. The scaling transfer function looks as shown in FIG. 15.

The second function is to avoid wrong results with pictures, which contain only texture. Such pictures produce very high variances because there are no flat blocks for variance measurement in the gvlCandidates block available. This effect increases with high sharpness and contrast. This may result in a FT map, which is indicating a completely flat picture although it is completely textured.

A countermeasure for this problem is, to add a linearly increasing offset, if the noise level (GVLstab) exceeds a certain threshold ftnlsc_nv_min, which indicates that this high variance level might not result from noise in a flat area. The offset is increasing linearly up to the maximum value 255 when the measured noise level is surely not stemming from noise in a flat area but from a high contrast textured picture. The transfer function for the offset function looks as shown in FIG. 16.

The specific processing or algorithmic steps are as follows:
1. Calculate the linear transfer function for the filter curve from ftnlsc_nla, ftnlsc_nlc.
2. Calculate the scaling factor for the actual picture.
3. Scale the input FT map globally with this factor and output it.
4. Calculate the linear transfer function in a similar way for ftnlsc_nv_min, ft_nv_max and add the appropriate offset to the ftmap value.

Implementation Notes:
1. The transfer functions may be implemented as look up table since the ftnlsc_nla, ftnlsc_nlc, ftnlsc_nv_min and ftnlsc_nv_max are set only once.
2. The parameters ftnlsc_nla and ftnlsc_nlc are set per default to 70 and 218.
3. Values of ftnlsc_nv_min and ftnlsc_nv_max are currently set to 512 and 1024.

Homogeneous/Flat Texture Final Linear Scale—ftMapScale
Input: Noise adaptive scaled flat vs. texture map ftmap_nlscout to the enhancer component.
Parameters: ftmap_scale_gain—FT map scaling gain factor ftmap_scale_offset—FT map scaling offset factor
Output: Final scaled flat vs. texture map ftmapout to the enhancer component.
Process/Algorithm:

This block is doing a final linear scaling of the FT map regarding the incoming two parameters scale_gain & scale_offset and is described by FIG. 17.

Implementation Notes:

The default setting are ftmap_scale_gain=1 and ftmap_scale_offset=0 so there is no change of FT map.

In addition, these and further aspects of the present invention will be further discussed in the following:

The present invention inter alia also relates to multi-scale in picture noise measurement.

For several digital picture processing application it is important to have the level of noise, in order to be able to compensate for it.

The problem is how or where to measure the noise level. Since texture can be confused as noise, the best would be to measure in proper areas, typically flat.

The idea, here proposed, is to try to select a certain number of areas in that is very likely to be present only noise.

The concept is that flat areas, with or without noise, are sampling invariant and the noise property stay the same independently from sub-sample operations.

Known state of the art can lead to too optimistic values.

A window, of size M×N, is run over a given digital picture luminance map or part of it.

For each block defined by the window, several sub-blocks are extracted by means of sub-sampling.

This could be, for example, taking only the pixels that are at even coordinates, like (2,2), (4,4), (2,4) . . . (2x, 2y), the pixels that are at odd coordinates like (1,1), (3,3), (1,3) . . . (2x+1, 2y+1), the pixels with even x-coordinate and odd y-coordinate like (2,1), (2,3), (4,3) . . . (2x, 2y+1), and finally pixels which are at odd x-coordinate and even y-coordinate, like (1,2), (1,4), (3,4) . . . (2x+1, 2y).

Other sub-sampling possibilities are available, like taking odd and even columns and rows. The sub-sampling should anyway be "uniform" in the sense that should preserve flat and white noise characteristics.

Sub-sampling the block results in several matrices, for each matrix and for the original block, a uniformity parameter U, like variance or co-occurrence matrix homogeneity or histogram, is calculated. The U-vector of the block is then again checked for invariance, that is if the block was in a uniform area, with or without noise, the U(i) values should be somehow similar. So the variance of the vector U, called Q, can be calculated (or other statistical parameters, depending on the vector U size) and assigned to the belonging original block.

Once the process occurs for each block, K blocks with minimum Q are selected as measurement areas for noise.

In these blocks, the variance V is calculated (or taken from previous calculation, if available) as noise level.

The K-elements vector of variances V is then subject to a filtering, in order to reduce/eliminate false measurements effects. Several possibilities are available, like median filtering, averaging, minimum extraction or non-linear processing. One proposed filter is: consider min(V), median(V), maximum absolute error E between median(V) and the elements of the vector V. Compare E against median(V), if E is greater than a certain percentage of median(V), for example 20%~25%, than the considered noise value is min(V), otherwise median(V).

Of course, since the processing can occur for stream of pictures, also a temporal filtering of the measured values could be applied, in order to increase reliability of the detected noise value. This can be moving averaging or, again, median filtering or else.

In case some pictures do not have any flat areas, some countermeasures can be taken in order to predict the reliability of the measurement. For example the U value of the chosen blocks can be considered, alone or together with the supposed noise; an other option is to take some step to check the "edginess" or "texture" of the selected measurement blocks. Several standard operators, like "compass" or "Laws" or Fourier analysis, can be used for this purpose. Also the mean value of a block can give some indication of reliability, since a very low or very high mean level can suggest that the block is in an area to close to saturation and so not a good measurement location.

One further processing option is to use different sized block and consider good candidates, among the more uniform blocks, the ones with bigger size. This will produces better results.

More reliable measurement locations can be derived according to the present invention.

Further, these and further aspects of the present invention will be further discussed in the following:

The present invention inter alia also relates to noise measurement by temporal de-correlation.

For several digital picture processing application it is important to have the level of noise, in order to be able to compensate for it.

The problem is how or where to measure the noise level. Since texture can be confused as noise, a different measurement mechanism is required.

The idea, here proposed, is to try to detect noise as residual error from picture to picture comparison.

The concept is that the noise is un-correlated over time, while many parts of a video stream are correlated or even equal, so the temporal difference of proper picture areas can give the noise level.

Known state of the art has problem with too structured pictures, since noise and texture can be confused.

In a given a stream of pictures, fields or frames, a certain number L of M×N blocks are selected in a said first picture.

These L blocks can be chosen accordingly to different criteria. They could be, for example, all the possible M×N blocks present in the picture. In order to reduce complexity, they can just be some few carefully selected blocks. One possibility is to choose L distinct M×N blocks in the middle of the picture, to reduce border problems, or L random blocks, or blocks present in certain significant areas, like picture edges, or combinations of the above.

A search mechanism, like full search in a given range, is performed. This means that, within the search range, an error measurement is taken between the (each) source block in the current picture and target blocks in other, different, pictures.

This measurement is typically the sum of absolute values of the pixel by pixel difference, or the sum of the square values of the pixel by pixel difference, or any other de-correlation mechanism.

For each of the L blocks the best, in the minimum sense, K matches are considered. The pixel by pixel difference D between the blocks in the K list and the source block is calculated. The result is a list of K*L of D matrices. The variance of each matrix in the list is considered to be twice the variance of the present noise.

Of course these several values are taken in order to maximize the chance of having a good measurement, so the best matches and/or the minimum measured noise level will be considered and filtered, for example averaged, as final step.

One other option is to consider the K blocks as a single picture (difference) area. This means the noise level is half of the variance of the all difference values of the K blocks. This allows having relatively small blocks, increasing the matching possibilities, and allows calculating the noise level with many values, reducing the error.

The process is repeated for the second picture and so on.

The filtering operation can also be done for the different measured values in the stream, in order to clean the measured values over time and minimize the effects of situations like scene change or similar.

Note about interlaced streams. In this case, to get better results, it could be possible to apply the de-correlation operation between fields of the same type, i.e. the block matching process will be applied from A to A fields and, in a separate fashion, from B to B fields. The different values can then be averaged or somehow merged together.

The search mechanism can be more complex; for example it can consider luminance change between pictures, rotations, zooming and so on.

Noise measurement according to the present invention is independent of the picture content, in particular independent of the availability of flat areas.

In addition, in the following reference is again taken to FIGS. 19 to 27:

FIG. 19 is a schematic diagram for elucidating a structure of a sequence of images SI or of a image sequence SI which can be processed according to the present invention.

In FIG. 19 the image sequence SI is composed of a sequence of images I1, I2, . . . , I1, I1+1, I1+2, . . . For each image I1+1 but the first image I1 I1 is a directly preceding image, also denoted by I and I1+1 is referred to as a directly succeeding image, also denoted by I'. This is demonstrated by the linearly arranged sequence of squares I1, I1+1, I1+2 in FIG. 19.

In FIG. 20 a schematical demonstration of the structure of each of said images I1 is given. Each of the images I1—being a preceding image I or a succeeding image I'—are formed by a certain number of lines or rows and by a certain number of columns of picture elements which are also called pixels. According to the present invention the images are subdivided into blocks, namely blocks Bjk for a preceding image I and blocks Bjk' for a succeeding image I'. Therefore, each image I, I', I1 is subdivided into m lines and into n columns of blocks Bjk; j=1, ..., m, k=1, ... n.

As the images I, I', I1 are formed by lines and rows of pixels the blocks Bjk, Bjk' are also formed by certain rows and columns of pixels. One can assume but it is not necessary to do that that each of the blocks has an identical extension, lets say by M×N pixels. Then one has for each image I, I', I1, L'=m×n blocks Bjk per image, picture or frame with each of said blocks Bjk having M×N pixels PBjkab; j=1, ..., m; k=1, ..., n; a=1, ..., M; b=1, ..., N.

Based on such a subdivision of the images I, I', I1 into blocks Bjk, Bjk' and into pixels PBjkab, PBjkab' the inventive processing will be explained in the following based on the further FIGS. 22 to 25.

FIG. 22 elucidates in a schematic flow chart an embodiment of the inventive method for estimating noise in an image sequence, in particular in a video stream or the like.

After a starting or initialisation phase S0' a sequence SI of images I is provided in a first step S1'. The sequence SI of images I consists of temporally consecutive and separated images I. The images I have a certain format, which might be in particular fixed for all images of the sequence SI.

In a following step S2' block information BI is provided. Said block information BI is representative and/or descriptive for at least one image block B, preferably for a plurality of image blocks Bjk having a given position and/or a given extension in said format for a plurality of images and in particular for all images of the sequence SI of images I.

Based on said block information blocks B. Bjk, Bjk' are selected and analyzed with respect for at least one or a plurality of images I which are temporally separated from each other in said sequence SI of images I. This is done in a third step S3' of selecting and analysing.

In a following, fourth step from said analyses of step S3' a noise estimation value N, NV for said sequence SI of images I is derived as a temporally uncorrelated statistical property of said sequence SI of images I.

FIG. 23 is a schematic diagram for elucidating according to a preferred embodiment of the present invention a process of selecting blocks Bjk for a given image, frame, or picture I via a gliding window.

According to a first position W1 of a given gliding window W a first block B11 is defined. After a certain number of L' for the gliding window W with intermediate positions or locations W2 a final position W3 for said gliding window W is reached thereby defining after a certain number of intermediate blocks Bjk a final block Bmn.

The respective positions W1, W2, W3 may define an overlapping or a non-overlapping arrangement of window positions for the gliding window W. Consequently the respective blocks Bjk may also be overlapping or nonoverlapping. In particular, the entirety of blocks Bjk; j=1, ..., m; k=1, ..., n of L M×N blocks Bjk may define a complete—overlapping or non-overlapping coverage of the entire image, frame, or picture I.

FIG. 24 demonstrates in a schematic manner according to a preferred embodiment of the present invention an algorithm for defining sub-blocks SBjkl for a given block Bjk.

On the left hand side of FIG. 24 a certain block Bjk of the given image, frame, or picture I is shown comprising M×N picture elements or pixels PBjkab. The respective pixels are assigned to certain classes A, B, C, and D. The class A is constituted by pixels PBjkab having odd row coordinates and having odd column coordinates. Class B is constituted by pixels PBjkab having odd row coordinates and having even column coordinates. Class C is constituted by pixels PBjkab having even row coordinates and having odd column coordinates. Finally, class D is constituted by pixels PBjkab having even row coordinates and having even column coordinates. Each of the subsets or classes A to D of pixels PBjkab define respective sub-blocks SBjkl which are shown on the right hand side of FIG. 24 and which may be representative by respective matrices A, B, C, and D. For these matrices A, B, C and D a certain uniformity measure U for each of the matrices A, B, C, and D may be defined according to some formula or algorithm may be denoted by $\sigma(X):=\text{sigma}(X)$ with X=A, B, C, D.

FIG. 25 demonstrates by means of a schematic diagram an alternative for constructing sub-blocks SBjkl for a given block Bjk.

The respective block Bjk is shown on the upper and lower portions of the right hand side of FIG. 25. On the upper side the respective block Bjk is subdivided into columns. Thereby a class A is defined described the entity of odd numbered columns. The class B is defined by the respective even numbered columns. Thereby the entities of respective even numbered columns and odd numbered columns define sub-blocks SBjkl which are represented by matrices A and B at the upper portion of FIG. 25 on the right hand side.

In a similar way odd numbered rows and even numbered rows respectively define classes C and D. This subdivision is shown in FIG. 25 at the lower portion on the left hand side. Similarly, sub-blocks SBjkl are defined which are represented by matrices C and D as entities of the odd numbered rows and the even numbered rows, respectively. These matrices C and D as sub-blocks SBjkl are shown at the lower portion of FIG. 25 at the right hand side. For each of said matrices A, B, C, and D again a uniformity measure U may be defined by some formula or algorithm and may be denoted by $\sigma(X):=\text{sigma}(X)$ with X=A, B, C, D.

FIG. 26 is a schematic block diagram for elucidating in form of a flow chart details of a preferred embodiment of the inventive method for estimating noise in an image sequence. FIG. 26 therefore elucidates details with respect to the determining algorithm for a noise value NV=NV(I) describing the noise or a noise estimation in an image sequence SI of images I.

In a step T1' for each block Bjk in a given image, frame, or picture I sub-blocks SBjkl with l=1, ..., 4—i.e. SBjk1, SBjk2, SBjk3, SBjk4—are defined and in this example denoted by its classes A, B, C, D and the like, i.e. SBjk1=A, SBjk2=B, SBjk3=C, SBjk4=D. For the block Bjk and for each of its respective said sub-blocks Sbjkl of the classes A, B, C, D respective uniformity values $\sigma(Bjk)$, $\sigma(SBjk1)=\sigma(A)$, $\sigma(SBjk2)=\sigma(B)$, $\sigma(SBjk3)=\sigma(C)$, $\sigma(SBjk4)=\sigma(D)$ are derived. The function $\sigma(.)=\text{sigma}(.)$ is a given and predefined evaluation function, for instance a statistical property derived from the elements of the underlying matrix X which is one of the block Bjk as such or one of the sub-blocks SBjkl, l=1, ..., 4, i.e. A, ..., D. From the set of $\sigma$-values for the block Bjk as such and for the sub-blocks A, ..., D a uniformity vector U(Bjk) is defined and constructed, for instance according to the following formula (I):

$$Ujk := U(Bjk) := \langle (\sigma(SBjk1), \ldots, \sigma(SBjk1), \ldots, \sigma(SBjkL)) \rangle. \quad (I)$$

From this vector U of σ-values for the respective block Bjk a quality estimation Q or Q-value for this respective block Bjk is derived from the U-vector, for instance according to the following formula (II):

$$Qjk := Q(Bjk) := \sigma(U(Bjk)) \quad (II)$$

In a following step T2' a variance vector V:=V(I) or V-vector V:=V(I) is defined for the entirety of blocks Bjk which is defined for the respective image, frame, or picture I in question. This is done by first deriving variance values Vjk:=Var(Bjk) for the respective blocks Bjk. Then a number of K blocks Bjk—K being an integer—for which the Q-values Qjk are minimal within the entity of all blocks Bjk are selected. From the entirety of K blocks Bjk with minimal Q-values the respective variance values Vjk:=Var(Bjk) are taken in order to form the respective V-vector V=V(I). Therefore the V-vector V=V(I) which is a function of the underlying image, frame, or picture I, indicated by the expression V=V(I).

Summing up all these facts according to a preferred embodiment of the pre-sent invention the V-vector V(I) for an image, frame, or picture I may be defined according to the following formulas (III) and (IV):

$$Vjk = Vjk(I) := Var(Bjk) := \text{variance}(Bjk) \quad (III)$$

and $$V = V(I) := \langle \min\_KQ\{Vjk(I)\} \rangle. \quad (IV)$$

Then according to a following step T3' a noise value NV may be defined as a statistical property over the vector V(I) and its entries Vjk for which the Q-values Q=Q(Bjk) of the respective blocks Bjk are minimal. The statistical property may for instance be the variance of the vector V(I) and its entries Vjk. In addition the variance is filtered according to some filter algorithm. Therefore, according to a preferred embodiment of the present invention the noise value NV as a function of the underlying image, frame, or picture I, i.e. NV=NV(I) may be given according to the following formula (V).

$$NV = NV(I) := \text{Filter}(Var(V(I))) = \text{Filter}(\text{variance}(V(I))). \quad (V)$$

FIG. 27 describes by means of a block diagram elucidating a respective flow chart an example for a filter process in order to derive the noise value NV=NV(I) for an underlying image, frame, or picture I.

In a first step U1' the variance value of the V-vector V. i.e. the value Var(V(I)) is further evaluated by calculating the medium value, the minimal value and the maximum value according to the following formulas (VI), (VII) and (VIII):

$$medN(I) := \text{median}(Var(V(I))) = \text{median}(\text{variance}(V(I))). \quad (VI)$$

$$minN(I) := \min(Var(V(I))) = \min(\text{variance}(V(I))) \quad (VII)$$

and $$maxN(I) := \max(Var(V(I))) = \max(\text{variance}(V(I))). \quad (VIII)$$

In a following step a first error value err1, a second error value err2 and a maximum error value eMax are calculated from the medium value, the minimal value and the maximum value, respectively according to the following formulas (IX), (X) and (XI):

$$err1(I) := abs(medN(I) - minN), \quad (IX)$$

$$err2(I) := abs(medN(I) - maxN) \quad (X)$$

and $$eMax(I) := \max(err1, err2). \quad (XI)$$

Then according to a further step U3' the absolute value of the difference between the medium medN=medN(I) and the maximum error eMax=eMax(I) is calculated and compared with respect to a normalized median value T×medN(I) with a normalization factor T.

Therefore the following expression according to formula (XII) is checked:

$$abs(medN(I) - eMax(I)) > T \cdot medN(I). \quad (XII)$$

If this relation is fulfilled the minimum value minN(I) is taken as said noise value NV=NV(I). Otherwise the median value medN(I) is taken as said noise value NV=NV(I), i.e. according to the following formulas (XIII) and (XIV):

$$noise(I) = NV(I) := \begin{cases} minN(I) & \text{if } abs(medN(I) - eMax(I)) > T \cdot medN(I) \\ medN(I) & \text{otherwise.} \end{cases} \quad (XIII, XIV)$$

Further, in the following reference is again taken to the FIGS. 19 and 28 to 33:

FIG. 19 is a schematical diagram for elucidating a structure of a sequence of images SI or of a image sequence SI which can be processed according to the present invention.

In FIG. 19 the image sequence SI is composed of a sequence of images I1, I2, ... I1, I1+1, I1+2, ... For each image I1+1 but the first image I1 I1 is a directly preceding image, also denoted by I and I1+1 is referred to as a directly succeeding image, also denoted by I'. This is demonstrated by the linearly arranged sequence of squares I1, I1+1, I1+2 in FIG. 1.

In FIG. 28 a schematical demonstration of the structure of each of said images I1 is given. Each of the images I1—being a preceding image I or a succeeding image I'—are formed by a certain number of lines or rows and by a certain number of columns of picture elements which are also called pixels. According to the present invention the images are subdivided into blocks, namely blocks Bjk for a preceding image I and blocks Bjk' for a succeeding image I'. Therefore, each image I, I', I1 is subdivided into m lines and into n columns of blocks Bjk; j=1, ..., m, k=1, ... n.

As the images I, I', I1 are formed by lines and rows of pixels the blocks Bjk, Bjk' are also formed by certain rows and columns of pixels. One can assume but it is not necessary to do that that each of the blocks has an identical extension, lets say by M×N pixels. Then one has for each image I. I', I1, L'=m×n blocks Bjk per image, picture or frame with each of said blocks Bjk having M×N pixels PBjkab; j=1, ..., m; k=1, ..., n; a=1, ..., M; b=1, ..., N.

Based on such a subdivision of the images I, I', I1 into blocks Bjk, Bjk' and into pixels PBjkab, PBjkab' the inventive processing will be explained in the following based on the further FIGS. 30 to 33.

FIG. 30 elucidates in a schematical flow chart an embodiment of the inventive method for estimating noise in an image sequence, in particular in a video stream or the like.

After a starting or initialization phase S0" a sequence SI of images I is provided in a first step S1'. The sequence SI of images I consists of temporally consecutive and separated images I. The images I have a certain format which might be in particular fixed for all images of the sequence SI.

In a following step S2' block information BI is provided. Said block information BI is representative and/or descriptive for at least one image block B, preferably for a plurality of image blocks Bjk having a given position and/or a given extension in said format for a plurality of images and in particular for all images of the sequence SI of images I.

Based on said block information blocks B, Bjk, Bjk' are selected and analyzed with respect for at least one or a plurality of images I which are temporally separated from each other in said sequence SI of images I. This is done in a third step S3" of selecting and analyzing.

In a following fourth step from said analyses of step S3" a noise estimation value N, NV for said sequence SI of images I is derived as a temporally uncorrelated statistical property of said sequence SI of images I.

FIG. 31 elucidates by means of a flow chart a processing scheme for a further embodiment of the inventive method for estimating noise in an image sequence. In this example of FIG. 31 the image sequence is given as an incoming video stream.

Said video stream is received in a first step T1". In the following step T2" a block search algorithm is applied. In said second step T2" according to some certain criteria one or a plurality of blocks are defined and selected in the sequence SI of images I forming the incoming video stream.

In the following step T3" from the possible blocks which have been found in the search process of step T2" a given number L of blocks is selected. The selection is performed for a given image and for one or a plurality of consecutive images I succeeding the given image in question.

After a certain evaluation process the obtained values are filtered in a following step T4".

Finally, in a step T5" the measured noise is obtained and provided based on the block-wise evaluation of the image sequence SI forming the incoming video stream.

FIG. 32 demonstrates schematically the relationship of one given block Bjk of a given frame N or a given preceding image I when compared to respective blocks Bjk' of a succeeding frame N+1, I'. By means of an evaluation process, for instance by calculating difference matrices Drstu=Btu'−Brs for all possible combinations of source blocks Brs of the preceding frame I, I1 and target blocks Btu' of the succeeding frame I', I1+1, a certain number of combined blocks from the preceding image I, I1 and from the succeeding image I', I1+1 have to be chosen, for instance by means of a minimum criterion and based on some absolute value or norm condition.

FIG. 33 by means of a schematical flow chart explains the evaluation process of the blocks between preceding and succeeding images.

In the first step U1" L blocks Bjk of M×N pixels are considered.

In the following step U2" the temporal search algorithm is applied with respect to a succeeding image or frame I', for instance with respect to the direct next frame I'.

Then, the search results are evaluated with respect to a certain norm condition and the K best matches for each block, for instance based on the direct pixel difference are provided.

Therefore, one has a combination of K×L blocks of the preceding frame I and of the succeeding frame I'. In a following step U4" the respective K×L difference matrices are calculated. Then the variances as a statistical measure are obtained for each of said K×L difference matrices.

In a final step U5" the K×L noise values are then filtered in order to obtain a single noise measurement value N, NV.

REFERENCE SYMBOLS

Bjk Block of an image, frame, picture
HTDD Homogeneous-texture discrimination data
HTDM Homogeneous-texture discrimination map
I Image, frame, picture
ID Digital image data
inD Input data
IR Image region
outD Output data
HR Homogeneous/flat image region
TR Texture/textured image region
T Threshold value
V, Vo Global/overall variance/variance value
Vx Local variance/variance value (for block or class of blocks)
B block, preceding block
B' succeeding block
Bjk block, preceding block, block of a preceding image/frame, picture
Bjk' block, succeeding block, block of a succeeding frame/image/picture
I (preceding) image/frame/picture
I' (succeeding) image/frame/picture
I1 image/frame/picture in the sequence SI
L number of selected blocks per image/frame/picture
L' number of blocks in an image/frame/picture
m number of blocks in a column in an image/frame/picture
M number of pixels in a column in a block
n number of blocks in a line/row in an image/frame/picture
N number of pixels in a line/row in a block
NV, NV(I) noise value, noise value for image I
Pjkab image element, pixel in block Bjk of n preceding image/frame/picture I, I1
Pjkab' image element, pixel in block Bjk' of n preceding image/frame/picture I', I1+1
Qjk Quality (estimation) value for block Bjk
SBjk1 Sub-block, sub-sampling of block Bjk
SI sequence of images/frames/pictures
σ(.), sigma(.) uniformity function
U(.) uniformity function
V, V(I) variance vector, vector of variance values for image I
Var(.), variance(.) variance function
Vjk variance value for block Bjk
B block, preceding block
B' succeeding block
Bjk block, preceding block, block of a preceding image/frame, picture
Bjk' block, succeeding block, block of a succeeding frame/image/picture
I (preceding) image/frame/picture
I' (succeeding) image/frame/picture
I1 image/frame/picture in the sequence SI
L number of selected blocks per image/frame/picture
L' number of blocks in an image/frame/picture
m number of blocks in a column in an image/frame/picture
M number of pixels in a column in a block
n number of blocks in a line/row in an image/frame/picture
N number of pixels in a line/row in a block
Pjkab image element, pixel in block Bjk of n preceding image/frame/picture I, I1

Pjkab' image element, pixel in block Bjk' of n preceding image/frame/picture I', I1+1
SI Sequence of images/frames/pictures

The invention claimed is:

1. A method for discriminating texture regions and flat regions in an image, the method comprising:
   dividing the image into blocks of pixels;
   dividing each block into a plurality of pixel groups arranged in a sub-sampling raster;
   calculating the following variance values a for each block:
      an overall variance $\sigma^{tot}$ for all pixels within the block,
      sub-variances $\sigma_A, \sigma_B, \sigma_C, \sigma_D, \ldots$ for the pixels of each pixel group, and
      a variance $\sigma_{var}$ of the sub-variances and the overall variance;
   determining a predetermined number of smallest values $\sigma^{var}$ of all blocks;
   generating an array of the values $\sigma_{tot}$ of the respective blocks corresponding to the determined smallest values $\sigma_{var}$;
   selecting one of the values $\sigma_{tot}$ from the array of variance values as a Global Variance Level GVL;
   determining a Global Value Threshold GVT based on the Global Variance Level GVL;
   calculating a local variance level $\sigma_{loc}$ for each pixel; and
   generating a map comprising homogeneous-texture discrimination data indicating texture regions and flat regions within the image from a comparison of GVT and $\sigma_{loc}$.

2. The method according to claim 1, wherein the predetermined number of smallest values $\sigma_{var}$ is five.

3. The method according to claim 2, wherein the dividing each block into a plurality of pixel-groups comprises dividing into four blocks A, B, C and D.

4. The method according to claim 2, wherein the selecting of the Global Variance Level GVL comprises:
   calculating a smallest value $\sigma_{totmin}$ of the array of variance values;
   calculating a median $\sigma_{totmed}$ of the values of the array of variance values;
   calculating distances $\delta$ for each element of the array or values to $\sigma_{totmed}$; and
   determining the maximum $\delta_{max}$ of all distances $\delta$, wherein
   GVL is $\sigma_{totmed}$ if $\delta_{max}$ is smaller than (gvl_med_weight times $\sigma_{totmed}$),
   GVL is $\sigma_{totmin}$ if $\delta_{max}$ is larger than (gvl_med_weight times $\sigma_{totmed}$), and
   gvl_med_weight is a constant value.

5. The method according to claim 2, wherein the calculating the local variance level $\sigma_{loc}$ for a pixel comprises calculating the variance for all pixels within a block of 5×5 pixels around the pixel centered in the block.

6. The method according to claim 2, wherein the generating the map indicating texture regions and flat regions comprises binarily deciding between texture regions and flat regions according to a comparison of $\sigma_{loc}$ and GVT.

7. The method according to claim 2, wherein the calculating of variances a is performed according to the equation $$\sigma = \frac{1}{N} \cdot \sum (x(i) - \mu)^2$$

for all pixels x(i) in a block, where N is the number of pixels in the block and μ describes the pixel average in the block.

8. The method according to claim 2, wherein the calculating of variances σ is performed according to the equation $$\sigma = \frac{1}{N} \cdot \sum |x(i) - \mu|$$

for all pixels x(i) in a block, where N is the number of pixels in the block and μ describes the pixel average in the block.

9. The method according to claim 2, wherein the homogeneous-texture-discrimination data are cleaned, by a cleaning process, in order to improve its homogeneity to thereby avoid side effects.

10. The method according to claim 9, wherein in said cleaning process small spots within homogeneous sections are removed.

11. The method according to claim 2, further comprising:
   a homogeneous texture smoothing process with respect to said homogeneous-texture-discrimination data, which is adapted in order to smoothen transitions in said homogeneous-texture-discrimination data.

12. The method according to claim 11, wherein a vertical IIR filter is used in the homogeneous-texture smoothing process.

13. The method according to claim 11, wherein a low pass filtering process is used for the homogeneous-texture-smoothing process.

14. The method according to claim 2, comprising a homogeneous-texture noise level scale process.

15. The method according to claim 2, comprising a homogeneous-texture linear scale process in order to provide optimization parameters.

16. A device for discriminating texture regions and flat regions in an image, the device comprising a noise measurement computer processor configured to:
   divide the image into blocks of pixels;
   divide each block into a plurality of pixel-groups arranged in a sub-sampling raster;
   calculate the following variance values a for each block:
      an overall variance $\sigma_{tot}$ for all pixels within the block,
      sub-variances $\sigma_A, \sigma_B, \sigma_C, \sigma_D, \ldots$ for the pixels of each pixel group, and
      a variance $\sigma_{var}$ of the sub-variances and the overall variance;
   determine a predetermined number of smallest values $\sigma_{var}$ of all blocks;
   generate an array of the values $\sigma_{tot}$ of the respective blocks corresponding to the determined smallest values $\sigma_{var}$;
   select one of the values $\sigma_{tot}$ from the array of variance values as a Global Variance Level GVL;
   determine a Global Value Threshold GVT based on the Global Variance Level GVL;
   calculate a local variance level $\sigma_{loc}$ for each pixel; and
   generate a map comprising homogeneous-texture discrimination data indicating texture regions and flat regions within the image from a comparison of GVT and $\sigma_{loc}$.

17. A non-transitory computer-readable storage medium including a computer program product comprising computer program means which are, when executed by a computer, configured to:
   divide the image into blocks of pixels;
   divide each block into a plurality of pixel-groups arranged in a sub-sampling raster;

calculate the following variance values a for each block:
  an overall variance $\sigma_{tot}$ for all pixels within the block,
  sub-variances $\sigma_A$, $\sigma_B$, $\sigma_C$, $\sigma_D$, ... for the pixels of each pixel group, and
  a variance $\sigma_{var}$ of the sub-variances and the overall variance;
determine a predetermined number of smallest values $\sigma_{var}$ of all blocks;
generate an array of the values $\sigma_{tot}$ of the respective blocks corresponding to the determined smallest values a $\sigma_{var}$;
select one of the values $\sigma_{tot}$ from the array of variance values as a Global Variance Level GVL;
determine a Global Value Threshold GVT based on the Global Variance Level GVL;
calculate a local variance level $\sigma_{loc}$ for each pixel; and
generate a map comprising homogeneous-texture discrimination data indicating texture regions and flat regions within the image from a comparison of GVT and $\sigma_{loc}$.

18. A device for discriminating texture regions and flat regions in an image comprising:
  means for dividing the image into blocks of pixels;
  means for dividing each block into a plurality of pixel-groups arranged in a sub-sampling raster;
  means for calculating the following variance values a for each block:
    an overall variance $\sigma_{tot}$ for all pixels within the block,
    sub-variances $\sigma_A$, $\sigma_B$, $\sigma_C$, $\sigma_D$, ... for the pixels of each pixel group, and
    a variance $\sigma_{var}$ of the sub-variances and the overall variance,
  means for determining a predetermined number of smallest values $\sigma_{var}$ of all blocks;
  means for generating an array of the values $\sigma_{tot}$ of the respective blocks corresponding to the determined smallest values $\sigma_{var}$;
  means for selecting one of the values $\sigma_{tot}$ from the array of variance values as a Global Variance Level GVL;
  means for determining a Global Value Threshold GVT based on the Global Variance Level GVL;
  means for calculating a local variance level $\sigma_{loc}$ for each pixel; and
  means for generating a map comprising homogeneous-texture discrimination data indicating texture regions and flat regions within the image from a comparison of GVT and $\sigma_{loc}$.

* * * * *